United States Patent
Yuan et al.

(10) Patent No.: US 11,301,093 B2
(45) Date of Patent: Apr. 12, 2022

(54) POSITIVE AND NEGATIVE VOLTAGE DRIVING CIRCUIT, CHIP, ACTIVE STYLUS AND DRIVING METHOD

(71) Applicant: Shenzhen Goodix Technology Co., Ltd., Shenzhen (CN)

(72) Inventors: Guangkai Yuan, Shenzhen (CN); Zhi Tang, Shenzhen (CN); Haiming Shen, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/060,004

(22) Filed: Sep. 30, 2020

(65) Prior Publication Data

US 2021/0041984 A1    Feb. 11, 2021

Related U.S. Application Data

(63) Continuation of application No. PCT/CN2019/099790, filed on Aug. 8, 2019.

(51) Int. Cl.
*G06F 3/044* (2006.01)
*G06F 3/0354* (2013.01)

(52) U.S. Cl.
CPC ........ *G06F 3/0441* (2019.05); *G06F 3/03545* (2013.01)

(58) Field of Classification Search
CPC .... G06F 3/0412; G06F 3/0446; G06F 3/0416; G06F 3/041; G06F 3/04166
See application file for complete search history.

(56) References Cited

U.S. PATENT DOCUMENTS 7,626,575 B2 * 12/2009 Cho ................. G06F 3/03545
                                                    345/173
8,134,542 B2 *  3/2012 Hagen ............... G06F 3/046
                                                    345/179
(Continued)

FOREIGN PATENT DOCUMENTS

CN    101634910 A    1/2010
CN    107438941 A    12/2017
(Continued)

OTHER PUBLICATIONS

Shenzhen Goodix Technology Co., Ltd., International Search Report, PCT/CN2019/099790, Apr. 29, 2020, 5 pgs.
(Continued)

*Primary Examiner* — Olga V Merkoulova
(74) *Attorney, Agent, or Firm* — USCH Law, PC

(57) ABSTRACT

Some embodiments of the present disclosure provide a positive and negative voltage driving circuit. The positive and negative voltage driving circuit includes: a positive and negative voltage generating module and a control module. The positive and negative voltage generating module includes a switch module. The control module is configured to control a turn-off state and a turn-on state of the switch module to enable the positive and negative voltage generating module to output a positive voltage and a negative voltage to a stylus tip of an active stylus. The positive and negative voltage driving circuit of the embodiments of the present disclosure can significantly reduce the driving power consumption of the active stylus while ensuring driving effects.

18 Claims, 13 Drawing Sheets

(56) References Cited

U.S. PATENT DOCUMENTS

| | | | | |
|---|---|---|---|---|
| 8,638,320 | B2* | 1/2014 | Harley | G06F 3/0441 345/179 |
| 8,928,635 | B2* | 1/2015 | Harley | G06F 3/0383 345/179 |
| 9,158,393 | B2* | 10/2015 | Vlasov | G06F 3/0446 |
| 9,886,104 | B2* | 2/2018 | Zeliff | G06F 3/0441 |
| 2008/0129709 | A1 | 6/2008 | Lin et al. | |
| 2012/0154340 | A1* | 6/2012 | Vuppu | G06F 3/0441 345/179 |
| 2012/0194484 | A1* | 8/2012 | Lehman | G06F 3/0443 345/179 |
| 2012/0223919 | A1* | 9/2012 | Lin | G06F 3/0441 345/179 |
| 2012/0327045 | A1* | 12/2012 | Skinner | G06F 3/03545 345/179 |
| 2013/0002606 | A1* | 1/2013 | Mann | G06F 3/0442 345/174 |
| 2013/0009560 | A1* | 1/2013 | Takeda | H05B 45/20 315/201 |
| 2013/0207938 | A1* | 8/2013 | Ryshtun | G06F 3/04166 345/179 |
| 2013/0214703 | A1* | 8/2013 | Bouchard | G01K 7/22 315/309 |
| 2014/0002422 | A1* | 1/2014 | Stern | G06F 3/0442 345/179 |
| 2014/0160091 | A1* | 6/2014 | Mann | G06F 3/0442 345/179 |
| 2014/0231243 | A1 | 8/2014 | Finley | |
| 2014/0306940 | A1* | 10/2014 | Fukushima | G06F 3/03545 345/179 |
| 2015/0309598 | A1* | 10/2015 | Zeliff | H02H 9/043 345/179 |
| 2018/0284910 | A1 | 10/2018 | Peretz et al. | |
| 2019/0179435 | A1 | 6/2019 | Yuan | |

FOREIGN PATENT DOCUMENTS

| | | |
|---|---|---|
| CN | 108124499 A | 6/2018 |
| CN | 108431741 A | 8/2018 |
| CN | 109906390 A | 6/2019 |
| WO | WO 2013/165466 A1 | 11/2013 |

OTHER PUBLICATIONS

Shenzhen Goodix Technology Co., Ltd.. Extended European Search Report, EP 19920644,2, Mar. 31, 2021, 8 pgs.

* cited by examiner

POSITIVE AND NEGATIVE VOLTAGE DRIVING CIRCUIT, CHIP, ACTIVE STYLUS AND DRIVING METHOD

CROSS REFERENCE TO RELATED APPLICATIONS

The present application is a continuation application of PCT Application No. PCT/CN2019/099790, filed Aug. 8, 2019, which is incorporated herein by reference in its entirety.

TECHNICAL FIELD

The present disclosure relates to the field of touch technology, and in particular, to a positive and negative voltage driving circuit, a chip, an active stylus, and a driving method.

BACKGROUND

With the development of touch technology and mobile terminal technology, more and more mobile terminals adopt touch manners for human-computer interactions. Currently, the touch screens used in mobile terminals are mostly capacitive touch screens and resistive touch screens. Among them, capacitive touch screens have been favored by more and more users with their good clarity, light transmittance and tactility.

In addition to direct touch operations with fingers, users of capacitive touch screens can also use active styluses instead of fingers for touch operations. At present, when the active stylus realizes driving communication with the terminal device, the stylus housing is connected to a system ground and the stylus tip directly receives a driving signal. In the existing technology solutions, the driving power consumption of the active stylus is relatively large under a certain driving effect.

SUMMARY

In view of this, embodiments of the present disclosure provide an active stylus, a boosting circuit and a control method thereof, which can reduce the driving power consumption of the active stylus while ensuring the driving effect.

In a first aspect, a positive and negative voltage driving circuit is provided, and the positive and negative voltage driving circuit includes: a positive and negative voltage generating module and a control module. The positive and negative voltage generating module includes a switch module, and the control module is configured to control a turn-off state and a turn-on state of the switch module, to enable the positive and negative voltage generating module to output a positive voltage and a negative voltage to a stylus tip of the active stylus.

In a second aspect, a chip is provided, and the chip includes the positive and negative voltage driving circuit as described in the first aspect.

In a third aspect, an active stylus is provided, and the active stylus includes the chip as described in the second aspect.

In a fourth aspect, a driving method is provided. The driving method is used for communication between an active stylus and a terminal device. The chip of the active stylus is configured to execute the driving method. The chip includes the positive and negative voltage driving circuit as described in the first aspect. The method includes: alternately generating the positive voltage and the negative voltage between the stylus tip and the stylus housing while controlling the switch module by the control module.

The positive and negative voltage driving circuit of the present disclosure can significantly reduce the driving power consumption of the active stylus, and does not require the power supply unit to generate high DC voltage, thereby reducing the difficulty of designing the power supply unit. Since the DC voltage input from the voltage unit to the positive and negative voltage driving circuit is low, the device does not need to withstand high voltages, which reduces the requirements for the device.

DETAILED DESCRIPTION

In order to make those skilled in the art better understand the technical solutions in the embodiments of the present disclosure, the technical solutions in the embodiments of the present disclosure will be clearly and completely described below with reference to the accompany drawings in the embodiments of the present disclosure. It is obvious that the described embodiments are only some of the embodiments of the present disclosure, rather than all the embodiments. Based on the embodiments in the present disclosure, all other embodiments obtained by those skilled in the art shall fall within the protection scope of the embodiments of the present disclosure.

Figure 1:
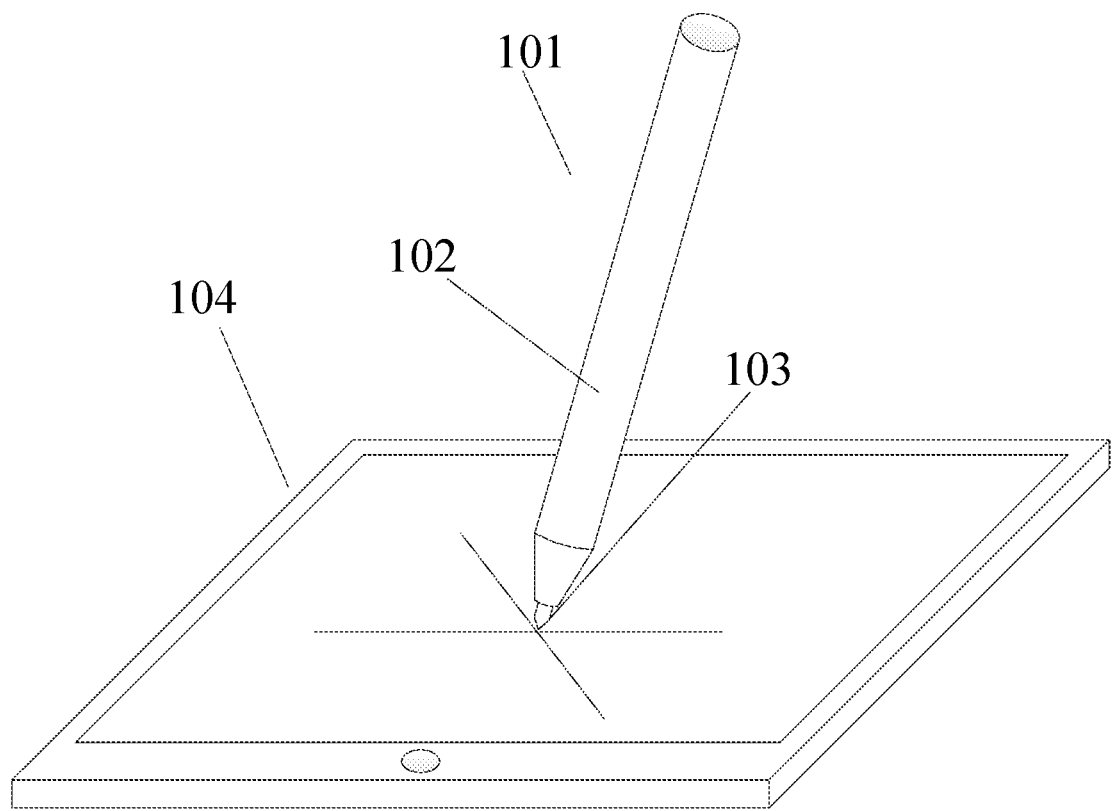
FIG. 1 illustrates an application scenario diagram of an active stylus used in conjunction with a terminal device according to an embodiment of the present disclosure.
Figure 2:
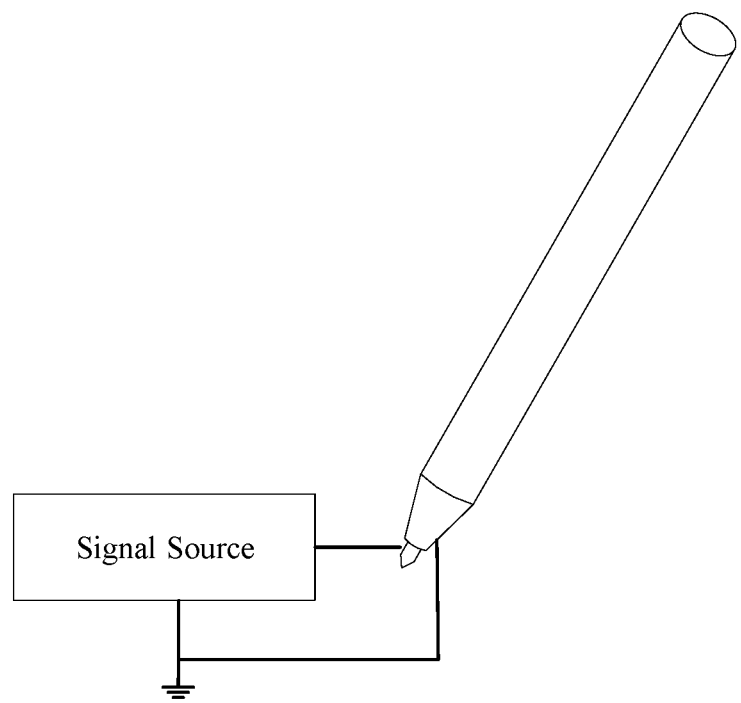
FIG. 2 illustrates a schematic diagram of the active stylus driving through a signal source when the active stylus communicates with the terminal device.
Figure 3:
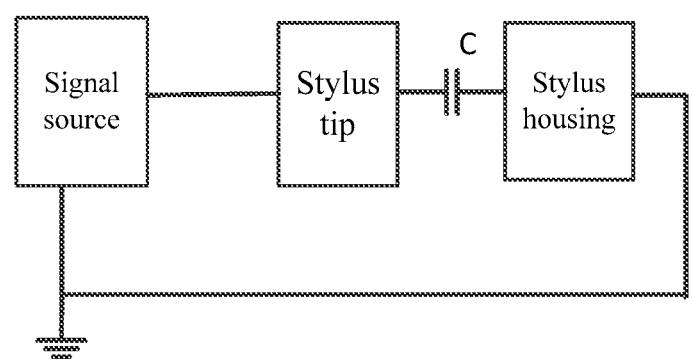
FIG. 3 illustrates a equivalent circuit diagram of the active stylus when driving.

A first embodiment of the present disclosure relates to a positive and negative voltage driving circuit which is applied to an active stylus. When a power supply unit inputs a power supply voltage to the positive and negative voltage driving circuit of the active stylus, the positive and negative voltage driving circuit outputs a high voltage driving signal to a stylus tip of the active stylus. FIG. 1 shows an application scenario diagram of a common active stylus 101 used in conjunction with a terminal device 104 with a touch screen. The active stylus 101 is configured to write or input instructions to the terminal device 104, such as a computer screen, a mobile device, a drawing board, etc., to realize human-computer interaction. As shown in FIG. 1, the active stylus 101 includes a stylus housing 102 and a stylus tip 103. In order to realize the communication between the active stylus 101 and the terminal device 104, the stylus tip needs to output a driving signal. When the active stylus realizes driving communication, the stylus housing of the active stylus is usually connected to the system ground, and the driving signals provided by a signal source are directly input to the stylus tip of the active stylus. FIG. 2 shows a schematic diagram of the active stylus driving through the signal source when the active stylus communicates with the terminal device. In order to improve the signal-to-noise ratio of the communication signal between the active stylus and the terminal device, the driving signals on the stylus tip are usually high voltage signals. FIG. 3 is an equivalent schematic diagram of FIG. 2, in which a capacitor C is a sum of a parasitic capacitor between the stylus tip and the stylus housing and other capacitors.

Figure 4:
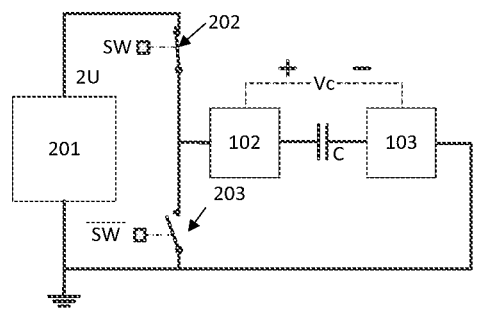
FIG. 4 illustrates a circuit structure diagram of a driving circuit of a traditional active stylus.
Figure 5:
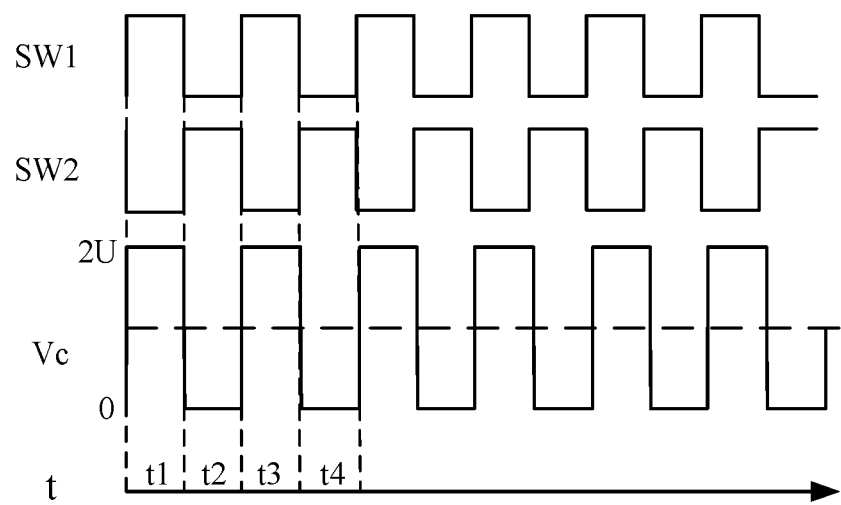
FIG. 5 illustrates an operation waveform diagram of the driving circuit of the traditional active stylus in FIG. 4.

FIG. 4 is a schematic structural diagram of a known active stylus driving circuit. As shown in FIG. 4, the active stylus driving circuit includes a signal source 201, a first switch 202 and a second switch 203. The positive electrode of the signal source 201 is connected to the stylus tip 102 of the active stylus through the switch 202, and the negative electrode of the signal source 201 (system ground) is connected to the stylus tip 102 of the active stylus through the switch 203 and directly connected to the stylus housing 103. A control module sends out a control signal SW to control the switch 202, and the control module sends out another control signal SW to control another switch 203. The voltage generated by the signal source 201 is a DC voltage of 2 U, then the positive voltage of the driving voltage Vc between the stylus tip and the stylus housing of the active stylus is 2 U, and the negative voltage of the Vc is 0V. As shown in FIG. 5, in the t1 stage, the control signal SW1 is at a high level, and another control signal SW2 is at a low level, that is, the switch 202 is turned on, and the other switch 203 is turned off. The signal source 201 charges the capacitor C. The voltage between the stylus tip and the stylus housing is the output voltage 2 U of the signal source. In the t2 stage, the control signal SW1 is at low the level and the other control signal SW2 is at a high level, which means that the switch 202 is turned off and the other switch 203 is turn on. The capacitor C discharges, and the voltage between the stylus tip and the stylus housing is 0. To calculate with one cycle in the timing diagram of FIG. 5 (t1 and t2 in the Figure are one cycle):

the driving power consumption of the circuit in FIG. 4 is $P1=0.5*C(2\ U)^2=2CU^2$.

Figure 6:
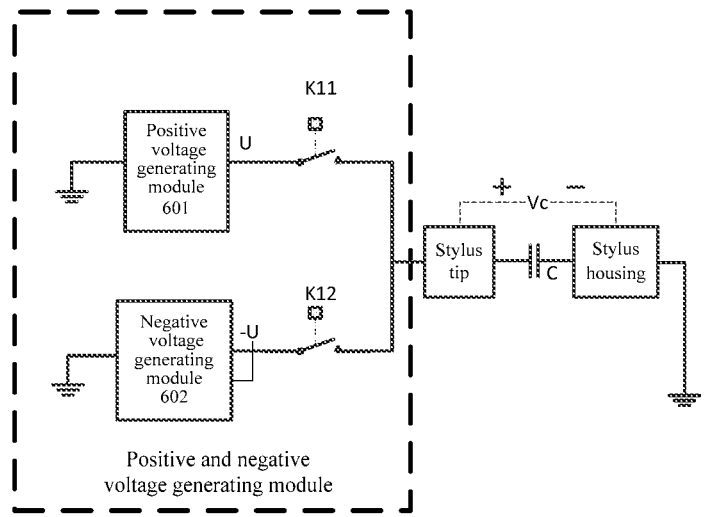
FIG. 6 illustrates a schematic block diagram of a positive and negative voltage driving circuit according to an embodiment of the present disclosure.
Figure 7:
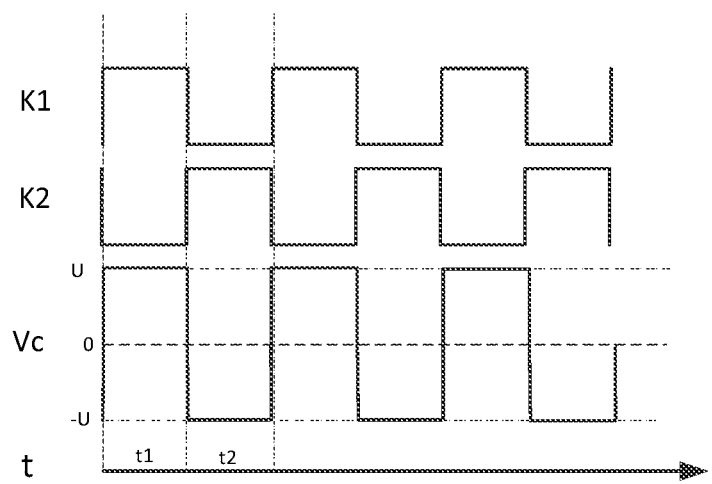
FIG. 7 illustrates an operation waveform diagram of the positive and negative voltage driving circuit in the embodiment of FIG. 6 of the present disclosure.

The inventor finds that the existing technology needs high power consumption to realize high-voltage driving. In order to reduce power consumption and ensure the effect of high-voltage driving, the present disclosure provides a positive and negative voltage driving circuit for driving of the active stylus (see FIG. 6). The positive and negative voltage driving circuit includes a positive and negative voltage generating module and a control module. The positive and negative voltage generating module includes a switch module. The control module is configured to control the turn-off state and the turn-on state of the switch module, to enable the positive and negative voltage generating module to alternatively output the positive voltage and the negative voltage to the stylus tip, and to enable the stylus tip to output driving signals to the touch screen. The driving signals include positive voltages and negative voltages. The positive and negative voltage generating module further includes a positive voltage generating module 601 and a negative voltage generating module 602. The switch module includes a first switch K11 and a second switch K12. One end of the positive voltage generating module is grounded and the other end of the positive voltage generating module is connected to the stylus tip through the first switch K11. One end of the negative voltage generating module 602 is grounded, and the other end of the negative voltage generating module 602 is connected to the stylus tip through the second switch K12. The stylus housing is directly grounded. Through the positive voltage generating module 601 and the negative voltage generating module 602, the capacitor C between the stylus tip and the stylus housing alternately generates positive voltages and negative voltages Vc. It should be understood that the positive voltages and negative voltages herein are relative, but not absolute. If it is specified that the voltage for the capacitor C in a charging stage is a positive voltage, the voltage for the capacitor C in a discharging stage is a negative voltage. The timing of Vc is shown in FIG. 7 in an ideal state. In a t1 stage, the control signal SW1 is at a high level, and the other control signal SW2 is at a low level. That is, the control signals control the first switch K11 to turn on and the second switch K12 to turn off. The positive voltage generating circuit module 603 charges the capacitor C, and the voltage between the stylus tip and the stylus housing is U. In a t2 stage, the control signal SW1 is at a low level, and the other control signal SW2 is at a high level. That is, the control signal controls the first switch K11 to turn off, and the second switch K12 to turn on. The capacitor C discharges the negative voltage generating module, and the voltage between the stylus tip and the stylus housing is −U, which achieves the same driving effect as the circuit of the existing technology in FIG. 4. To calculate with one cycle in the timing diagram of FIG. 7 (t1 and t2 in the figure are one cycle):

the driving power consumption of the circuit in FIG. 6 is $P1=0.5*CU^2+0.5*CU^2=CU^2$.

It can be seen that, under the same driving effect, that is, in the circumstance that the stylus tip of the active stylus outputs the same voltage difference, the positive and negative voltage driving circuit of the embodiments of the present disclosure can reduce the driving power consumption of the active stylus, and can reduce the DC voltage, thereby reducing the difficulty for the voltage unit to generate high DC voltage.

It should be understood that the positive and negative voltages in the embodiments of the present disclosure are relative, and are for the charging direction of the capacitor C between the stylus tip and the stylus housing. Assuming that the voltages generated in one charging direction of the capacitor C are positive voltages, the voltages generated in the other charging direction of the capacitor C is naturally negative voltages. In the following embodiments, the description is made by taking it as an example that the voltages generated in the charging direction from the stylus tip to the stylus housing are positive voltages, and the voltages generated in the charging direction from the stylus housing to the stylus tip are negative voltages.

The positive and negative voltage driving circuit of the present disclosure will be described in detail below with reference to specific embodiments.

Figure 8:
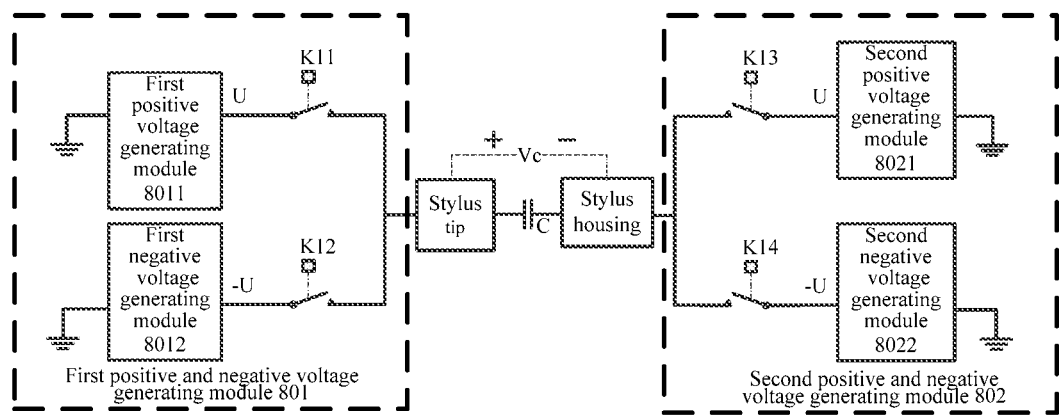
FIG. 8 illustrates a schematic block diagram of a positive and negative voltage driving circuit according to another embodiment of the present disclosure.

FIG. 8 is a schematic structural diagram of a floating positive and negative voltage driving circuit according to another embodiment of the present disclosure. As shown in FIG. 8, the positive and negative voltage driving circuit includes a first positive and negative voltage generating module 801 and a second positive and negative voltage generating module 802. The first positive and negative voltage generating module 801 includes a first positive voltage generating module 8011, a first negative voltage generating module 8012, a switch K11 and a switch K12. The second positive and negative voltage driving circuit 802 includes a second positive voltage generating circuit 8021, a second negative voltage generating module 8022, a switch K13 and a switch K14. One end of the first positive voltage generating module 8011 is grounded, and the other end of the first positive voltage generating module 8011 is connected to the stylus tip through the switch K11. One end of the first negative voltage generating module 8012 is grounded, and the other end of the first negative voltage generating module 8012 is connected to the stylus tip through the switch K12. One end of the second positive voltage generating module is grounded, and the other end of the second positive voltage generating module is connected to the stylus housing through the switch K13. One end of the second negative voltage generating module is grounded, and the other end of the second negative voltage generating module is connected to the stylus housing through the switch K14. Through the first positive and negative voltage generating module 801 and the second positive and negative voltage generating module 802, a positive voltage and a negative voltage Vc are alternately generated on the capacitor C between the stylus tip and the stylus housing. The first positive and negative voltage generating module 801 and the second positive and negative voltage generating module 802 may only need the input voltage value of the power supply unit VCC to be U to achieve the effect of the active stylus outputting a driving voltage of 4 U.

Comparing the schematic diagram of the circuit structure of the embodiment of the present disclosure shown in FIG. 8 with that shown in FIG. 4, under the same driving effect, that is, when the peak-to-peak voltage difference of the positive voltage and negative voltage generated between the stylus tip and the stylus housing is equal, the power supply unit VCC in FIG. 4 needs to input a DC voltage that is 4 times the DC voltage input by the power supply unit VCC in FIG. 8. The positive and negative voltage driving circuit in the embodiment of the present disclosure does not need the power supply unit VCC with a higher voltage, and the device does not need to withstand high voltages, which reduces the requirements for the device and also reduces the difficulty of generating a DC high voltage. When the circuit consumes the same power consumption, the driving voltage output by the active stylus of the present embodiment is 4 times the driving voltage of the existing technology.

The positive and negative voltage driving circuit of the embodiment of the present disclosure can significantly reduce the driving power consumption of the active stylus, and realizes that the power consumption of the floating positive and negative voltage driving circuit is only a quarter of that of the high voltage generating circuit of the existing technology, and does not require the power supply unit to generate high DC voltage, thereby reducing the difficulty of designing the power supply unit. Since the DC voltage input from the voltage unit to the positive and negative voltage driving circuit is small, the device does not need to withstand high voltage, which reduces the requirements for the device.

Figure 9:
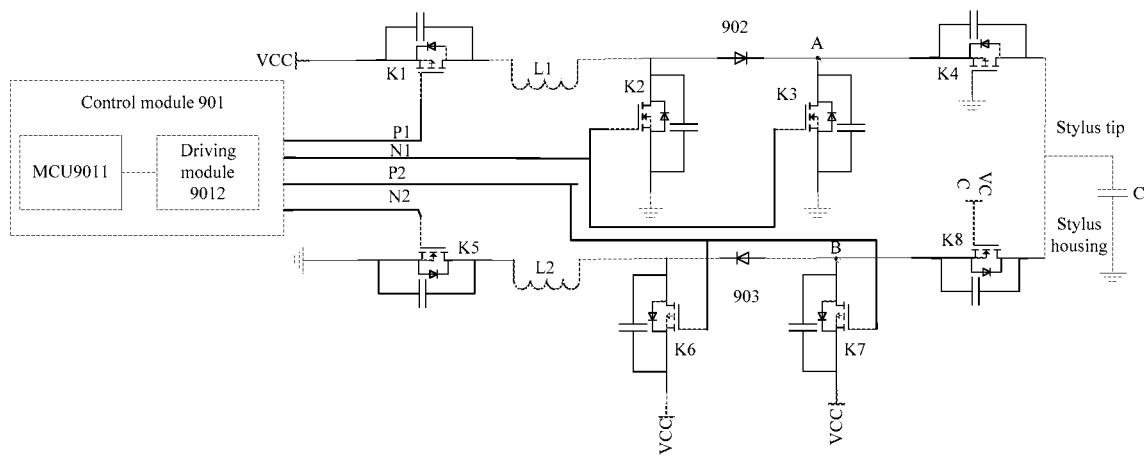
FIG. 9 illustrates a structure diagram of a positive and negative voltage driving circuit according to another embodiment of the present disclosure.

FIG. 9 is a schematic diagram of a positive and negative voltage driving circuit according to another embodiment of the present disclosure. As shown in FIG. 9, the positive and negative voltage driving circuit includes a positive and negative voltage generating module and a control module 901, and the positive and negative voltage generating module includes a switch module. The positive and negative voltage generating module also includes a first positive voltage generating module and a first negative voltage generating module. The first positive voltage generating module includes a first boosting unit, and the first boosting unit includes a first inductor L1 and a first diode 902. The first negative voltage generating circuit includes a second boosting unit, and the second boosting unit includes a second inductor L2 and a second diode 903. The switch module includes at least a first switch K1, a second switch K2, a third switch K3, a fourth switch K4, a fifth switch K5, a sixth switch K6, a seventh switch K7 and an eighth switch K8. The switches in this embodiment are field effect transistors. Since the field-effect transistor itself has parasitic capacitor, the parasitic capacitor is connected in parallel with the switch; or, the first boosting circuit and the second boosting circuit may be provided with a physical capacitor connected in parallel with each switch. In this way, the capacitance of the first boosting circuit and the second boosting circuit refers to the total capacitance after the physical capacitor is connected in parallel with the parasitic capacitor of the switch (field effect transistor) itself. In the following content, the embodiments of the present disclosure take the parasitic capacitor of the field effect transistor itself as an example for description.

The control module 901 is connected to a control terminal of the switch module, and the control module 901 is configured to control the state of each switch in the switch module. In this embodiment, the control module 901 includes a microcontroller unit (MCU) 9011 and a driving module 9012; the driving module 9012 is connected to the control terminal of the switch module for driving the switch module; the MCU 9011 is connected to the driving module 9012, and configured to control the driving manner of the driving module 9012, so that the driving module 9012 may generate a square wave with a certain duty cycle to control the switch module. The MCU is configured to control the driving module to output a first control signal P1, a second control signal N1, a third control signal P2 and a fourth control signal N2 to the switch module. The first control signal P1 is configured to control the turn-off state and the turn-on state of the first switch, the second control signal N1 is configured to control the turn-off state and the turn-on state of the second switch and the turn-off state and the turn-on state of the third switch, the third control signal P2 is configured to control the turn-off state and the turn-on state of the sixth switch and the turn-off state and the turn-on state of the seventh switch, and the fourth control signal N2 is configured to control the turn-off state and the turn-on state of the fifth switch. In this way, the first switch, the second switch, the third switch, the fourth switch, the fifth switch, the sixth switch, the seventh switch and the eighth switch are turn on alternately, to enable that a positive voltage and a negative voltage are alternately generated between the stylus tip and the stylus housing.

Specifically, the first switch is controlled by the first control signal P1, the second switch and the third switch serve as the second switch group which is controlled by the second control signal N1, and the sixth switch and the seventh switch serve as the third switch group which is controlled by the third control signal P2, the fifth switch is controlled by the fourth control signal N2. That is, the second switch 402 and the third switch 405 are turn on or turn off simultaneously, the sixth switch 403 and the seventh switch 404 are turn on or turn off simultaneously. One end of the first inductor L1 is connected to a power supply unit VCC through the first switch K1, the other end of the first inductor L1 is grounded through the second switch K2 and connected to a anode of the first diode 902, a cathode of the first diode 902 is grounded through the third switch K3, the cathode of the first diode 902 is connected to the stylus tip through the fourth switch K4, and the control terminal of the fourth switch K4 is grounded. One end of the second inductor L2 is grounded through the fifth switch K5, the other end of the second inductor L2 is connected to the power supply unit VCC through the sixth switch K6 and a cathode of the second diode 903, a anode of the second diode 903 is connected to the power supply unit VCC through the seventh switch K7, the anode of the second diode 903 is connected to the stylus tip through the eighth switch K8, and the control terminal of the eighth switch K8 is connected to the power supply unit VCC. The stylus housing is grounded.

It should be understood that in the positive and negative voltage driving circuit, each of the above switches may be metal oxide semiconductor (MOS) transistors, and each MOS transistor has its own parasitic capacitance, and in practical applications, the smaller the parasitic capacitance, the better the performance of the MOS transistor. Specifically, the first switch K1, the fourth switch K4, the sixth switch K6 and the seventh switch K7 may be PMOS devices; the second switch K2, the third switch K3, the fifth switch K5 and the eighth switch K8 may be NMOS devices. In an example, the driving module 9012 and the MCU 9011 may be integrated in a chip, and the square wave may be output directly at the chip's IO port; however, it is not limited to this, the MCU 9011 and the driving module 9012 may also be set separately, and the MCU 9011 outputs the square wave through the driving module 9012.

Figure 10:
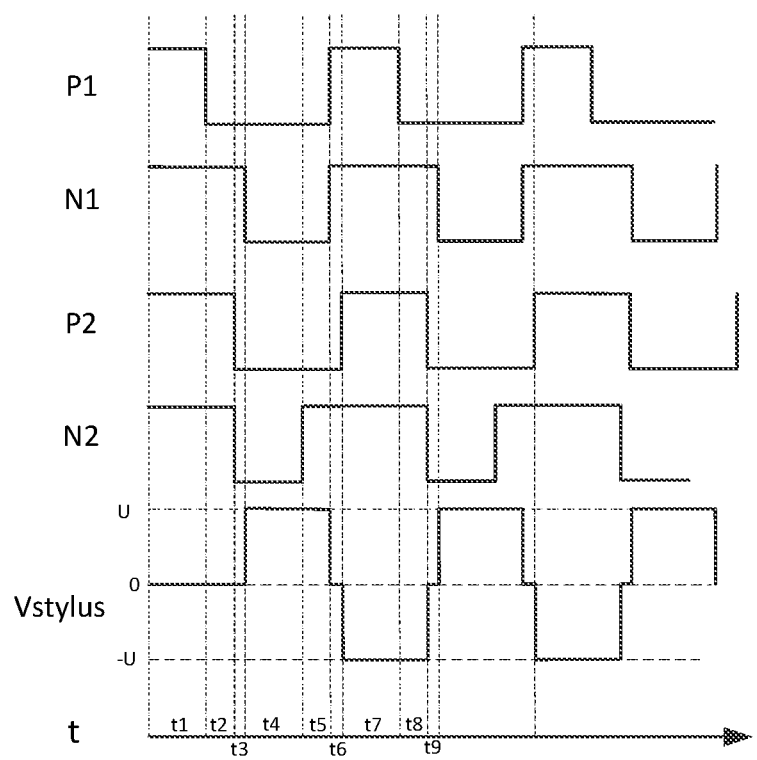
FIG. 10 illustrates an operation waveform diagram of the positive and negative voltage driving circuit of the embodiment in FIG. 9 of the present disclosure.

As shown in FIG. 10, the states of the first control signal P1, the second control signal N1, the third control signal P2 and the fourth control signal N2 are mainly divided into 9 stages. In a first stage, the first control signal P1 is at a high level, the second control signal N1 is at a high level, the third control signal P2 is at a high level, and the fourth control signal N2 is at a high level. In a second stage, the first control signal P1 is at a low level, the second control signal N1 is at a high level, the third control signal P2 is at a high level, and the fourth control signal N2 is at a high level. In a third stage, the first control signal P1 is at a low level, the second control signal N1 is at a high level, the third control signal P2 is at a low level, and the fourth control signal N2 is at a low level. In a fourth stage, the first control signal P1 is at a low level, the second control signal N1 is at a low level, the third control signal P2 is at a low level, and the fourth control signal N2 is at a low level. In a fifth stage, the first control signal P1 is at a low level, the second control signal N1 is at a low level, the third control signal P2 is at a low level and the control signal N2 is at a high level. In a sixth stage, the first control signal P1 is at a high level, the second control signal N1 is at a high level, the third control signal P2 is at a low level, and the fourth control signal N2 is at a high level. In a seventh stage, the first control signal P1 is at a high level, the second control signal N1 is at a high level, the third control signal P2 is at a high level, and the fourth control signal N2 is at a high level. In an eighth stage, the first control signal P1 is at a low level, the second control signal N1 is at a high level, the third control signal P2 is at a high level, and the fourth control signal N2 is at a high level. In a ninth stage, the first control signal P1 is at a low level, the second control signal N1 is at a high level, the third control signal P2 is at a low level, and the fourth control signal N2 is at a low level. The nine stages are explained as below.

In t1 stage, the first control signal P1 is at a high level, the second control signal N1 is at a high level, the third control signal P2 is at a high level, and the fourth control signal N2 is at a high level. That is, the first switch K1 is turned off, the second switch K2 and the third switch K3 are turned on, the fourth switch K4 is turned off, and the fifth switch K5 is turned on. The voltage at a point A is 0 and the voltage at the stylus tip is 0.

In t2 stage, the first control signal P1 is at a low level, the second control signal N1 is at a high level, the third control signal P2 is at a high level, and the fourth control signal N2 is at a high level. That is, the first switch K1 is turned on, the second switch K2 and the third switch K3 are turned on, the fourth switch K4 is turned off, the fifth switch K5 is turned on, the sixth switch K6 and the seventh switch K7 are turned on, and the eighth switch K8 is turned on. The voltage at the point A is 0 the voltage at a point B is close to 0, and the voltage at the stylus tip is 0. The power supply unit VCC charges the first inductor L1.

In t3 stage, the first control signal P1 is at a low level, the second control signal N1 is at a high level, the third control signal P2 is at a low level, and the fourth control signal N2 is at a low level. That is, the switch K1 is turned on, the second switch K2 and the third switch K3 are turned on, the fifth switch K5 is turned off, and the sixth switch K6 and the seventh switch K7 are turned on. The power supply unit VCC charges the first inductor L1 through the first switch K1. The voltage at the point B is VCC, the voltage at the stylus tip remains at 0, and the state remains unchanged. The longer the total time of t2+t3 is, the more energy the first inductor L1 accumulates.

In t4 stage, the first control signal P1 is at a low level, the second control signal N1 is at a low level, the third control signal P2 is at a low level, and the fourth control signal N2 is at a low level. That is, the first switch is turned on, the second switch K2 and the third switch K3 are turned off, the fifth switch K5 is turned off, the sixth switch K6 and the seventh switch K7 are turned on. The voltage at the point B is VCC. The energy stored by the first inductor L1 in the t2+t3 stage is transferred to the parasitic capacitor of the second switch K2 and the parasitic capacitor of the third switch K3, so that the voltage of the parasitic capacitor increases in a positive direction. When the voltage at the point A increases to be greater than the turn-on voltage of the fourth switch K4, the fourth switch K4 turns on, the energy stored in the first inductor L1 is transferred to the capacitor C of the stylus tip, and the voltage at the stylus tip increases to U.

In t5 stage, the first control signal P1 is at a low level, the second control signal N1 is at a low level, the third control signal P2 is at a low level, and the fourth control signal N2 is at a high level. That is, the first switch is turned on, the second switch K2 and the third switch K3 are turned off, the fifth switch K5 is turned on, the sixth switch K6 and the seventh switch K7 are turned on. The voltage at the point B is still VCC. The power supply unit VCC charges the second inductor L2 through the sixth switch K6, and is grounded through the fifth switch K5. The voltage at the stylus tip remains U.

In t6 stage, the first control signal P1 is at a high level, the second control signal N1 is at a high level, the third control signal P2 is at a low level, and the fourth control signal N2 is at a high level. That is, the first switch is turned off, the second switch K2 and the third switch K3 are turned on, the fifth switch K5 is turned on, the sixth switch K6 and the seventh switch K7 are turned on. The voltage at the point A is 0, the voltage at the point B is still VCC, and the voltage at the stylus tip drops from U to close to 0V through the body diode of the fourth switch K4. The power supply unit VCC charges the second inductor L2 through the sixth switch K6, and is grounded through the fifth switch K5. The longer the total time of t5+t6 stage is, the more energy the second inductor L2 accumulates. Since the voltage at the point B is VCC, the voltage at the point A is 0V, the voltages pass through the body diode of the eighth switch K8 and the body diode of the fourth switch K4 and discharges to the ground through the third switch K3, causing electric leakage, the time of the t6 stage should be controlled to be as short as possible, and the t6 stage is not even needed.

In t7 stage, the first control signal P1 is at a high level, the second control signal N1 is at a high level, the third control signal P2 is at a high level, and the fourth control signal N2 is at a high level. That is, the first switch K1 is turned off, the second switch K2 and the third switch K3 are turned on, the fifth switch K5 is turned on, the sixth switch K6 and the seventh switch K7 are turned off. The energy stored in the second inductor L2 in the t5+t6 stages is transferred to the parasitic capacitor of the sixth switch K6 and the parasitic capacitor of the seventh switch K7, so that a voltage for the capacitor increases in a negative direction. When the negative voltage at the point B increases to be greater than the turn-on voltage of the eighth switch K8, the eighth switch K8 is turned on, the energy stored on the second inductor L2 is transferred to the capacitor C of the stylus tip, so that the voltage at the stylus tip increases in a negative direction to a voltage −U.

In t8 stage, the first control signal P1 is at a low level, the second control signal N1 is at a high level, the third control signal P2 is at a high level, and the fourth control signal N2 is at a high level. That is, the first switch K1 is turned on, the second switch K2 and the third switch K3 are turned off, the fifth switch K5 is turned off, the sixth switch K6 and the seventh switch K7 are turned on. The voltage at the point A is 0, and the voltage at the stylus tip is −U. The power supply unit VCC charges the first inductor L1 through the first switch K1 and is grounded through the second switch K2.

In the t9 stage, the first control signal P1 is at a low level, the second control signal N1 is at a high level, the third control signal P2 is at a low level, and the fourth control signal N2 is at a low level. That is, the first switch K1 is turned on, the second switch K2 and the third switch K3 are turned off, the fifth switch K5 is turned off, the sixth switch K6 and the seventh switch K7 are turned on. The voltage at the point B is VCC. The voltage at the stylus tip−U rises from −U to be close to VCC through the body diode of the eighth switch K8. The power supply VCC charges the first inductor L1 through the first switch K1, and is grounded through the second switch K2. The longer the total time of T8+t9 stage is, the more energy the first inductor L1 accumulates. Since the voltage at the point B is VCC, the voltage at the point A is 0V, the voltage at the point B passes through the body diode of the eighth switch K8 and the body diode of the fourth switch K4, and discharges to the ground through the third switch K3, causing electric leakage, the time of the t9 stage should be controlled to be as short as possible, and the t9 stage is not even needed.

This circuit controls the magnitude of the output voltage U by adjusting the time of the t2+t3 stage and the t5+t6 stage, which may realize adjustable amplitude. The smaller the sum of the time of t1 stage, t2 stage, t3 stage and t4 stage is, the higher the frequency is; the larger the total time of t1 stage, t2 stage, t3 stage and t4 stage is, the smaller the frequency is. By adjusting the time of t1-t4 stages, the frequency may be adjusted.

That the control module 901 controls the switch module does not have to include the above 9 stages, but the fourth stage, the fifth stage, the seventh stage and the eighth stage needs to be included. The initial stage includes the first stage, the second stage, and the third stage, and the second stage needs to be included.

Compared with the existing technology, the boosting circuit and control method for the switch module provided by the embodiments of the present disclosure requires half of the power consumption of the existing technology. The boost to a high voltage can be achieved by inputting a low DC voltage through the power supply unit, and the design is simple. The DC voltage input by the power supply unit in the positive and negative voltage driving circuit only needs to meet half of that in the existing technology, and the power supply unit is not required to generate high voltages, which reduces the design difficulty of the power supply unit. The withstand voltage capability of the device required by the positive and negative voltage driving circuit no longer needs to be so high, which reduces the performance requirements for the device.

Figure 11:
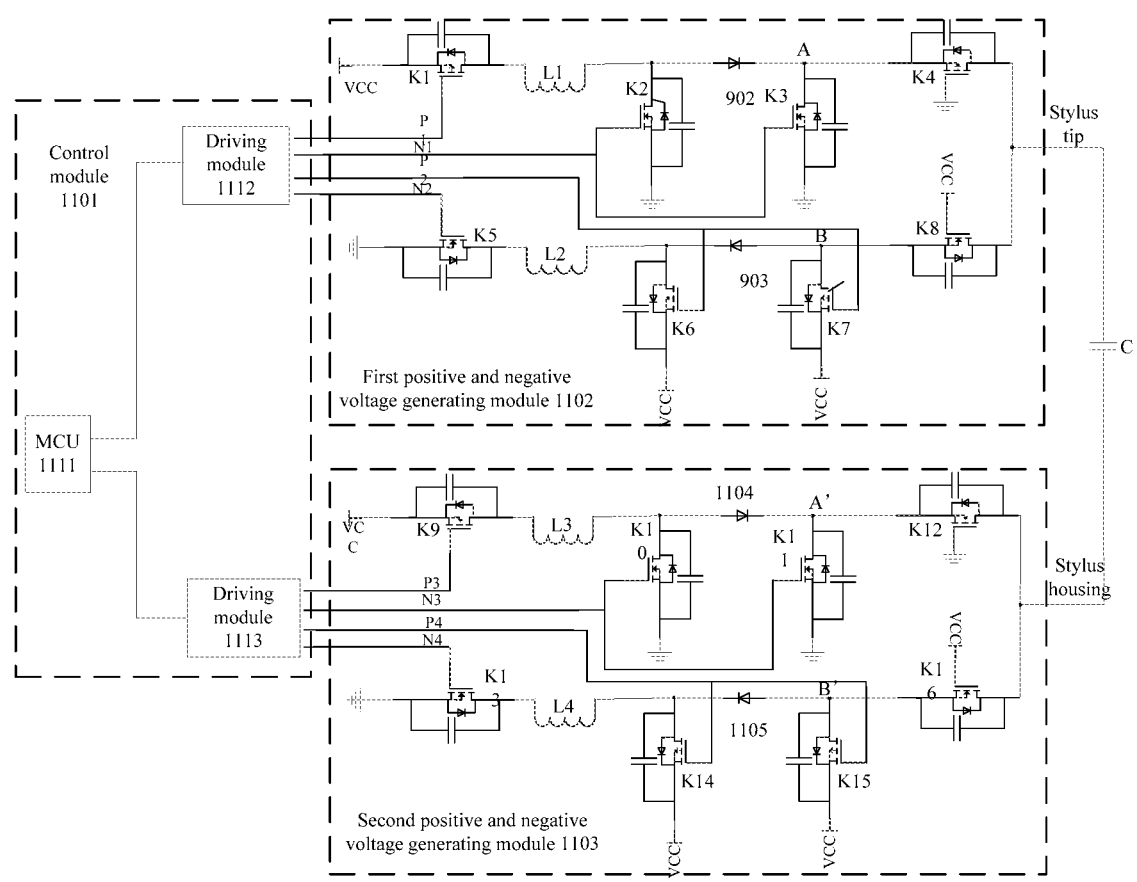
FIG. 11 illustrates a structure diagram of a positive and negative voltage driving circuit according to another embodiment of the present disclosure.

FIG. 11 is a schematic diagram of a floating positive and negative voltage driving circuit according to another embodiment of the present disclosure. As shown in FIG. 11, the positive and negative voltage driving circuit includes a positive and negative voltage generating module and a control module 1101, and the positive and negative voltage generating module includes a switch module. The positive and negative voltage generating module includes a first positive and negative voltage generating module 1102 and a second positive and negative voltage generating module 1103. The first positive and negative voltage generating module 1102 includes a first positive voltage generating module and a first negative voltage generating module. The second positive and negative voltage generating module 1103 includes a second positive voltage generating module and a second negative voltage generating module. The first positive voltage generating module and the first negative voltage generating module are similar to those in FIG. 9, and will not be discussed in detail here.

The second positive voltage generating module includes a third boosting unit, and the third boosting unit includes a third inductor L3 and a third diode 1104. The second negative voltage generating circuit includes a fourth boosting unit, and the fourth boosting unit includes a fourth inductor L4 and a fourth diode 1105. The switch module also includes a ninth switch K9, a tenth switch K10, an eleventh switch K11, a twelfth switch K12, a thirteenth switch K13, a fourteenth switch K14, a fifteenth switch K15 and a sixteenth switch K16. The switches of the present disclosure may be field effect transistors. Since the field effect transistor itself has parasitic capacitor, the parasitic capacitor is connected in parallel with the switch; or, the third boosting circuit and the fourth boosting circuit may be provided with a physical capacitor connected in parallel with each switch. In this way, the capacitance of the third boosting circuit and the fourth boosting circuit refers to the total capacitance after the physical capacitor is connected in parallel with the parasitic capacitor of the switch 22 (field effect transistor). In the following content, the embodiments of the present disclosure take the parasitic capacitor of the field effect transistor itself as an example for description.

The control module 1101 is connected to a control terminal of the switch module, and the control module 1101 is configured to control the state of each switch in the switch module. In this embodiment, the control module 1101 includes an MCU 1111, a driving module 1112 and a driving module 1113; the driving module 1112 and the driving module 1113 are connected to the control terminal of the switch module for driving the switch module; the connection manner and the control method of the driving module 1112 and the MCU 1111 have been illustrated in FIG. 9, and will not be described in detail here. The MCU 1111 is connected to the driving module 1113, and is configured to control the driving manner of the driving module 1113, to enable the driving module 1113 to generate a square wave with a certain duty cycle to control the switch module.

The MCU is configured to control the driving module 1113 to output a fifth control signal, a sixth control signal, a seventh control signal and a eighth control signal to the switch module. The fifth control signal is configured to control the turn-off state and the turn-on state of the ninth switch K9, the sixth control signal is configured to control the turn-off state and the turn-on state of the tenth switch K10 and the turn-off state and the turn-on state of the eleventh switch K11, the seventh control signal is configured to control the turn-off state and the turn-on state of the fourteenth switch K14 and the turn-off state and the turn-on state of the fifteenth switch K15, and the eighth control signal is configured to control the turn-off state and the turn-on state of the thirteenth switch K13. The ninth switch K9, the tenth switch K10, the eleventh switch K11, the twelfth switch K12, the thirteenth switch K13, the fourteenth switch K14, the fifteenth switch K15 and the sixteenth switch K16 are alternately turned on, to generate a positive voltage and a negative voltage alternately between the stylus tip and the stylus housing.

Specifically, the ninth switch K9 is controlled by the fifth control signal P3, the tenth switch K10 and the eleventh switch K11 serve as the sixth switch group which is controlled by the sixth control signal N3, the fourteenth switch K14 and the fifteenth switch K15 serve as the seventh switch group which is controlled by the seventh control signal P4, and the thirteenth switch K13 is controlled by the eighth control signal N4. That is, the tenth switch K10 and the eleventh switch K11 are turned on or turned off simultaneously, while the thirteenth switch K13 and the fourteenth switch K14 are turned on or turned off simultaneously. One end of the third inductor L3 is connected to the power supply unit VCC through the ninth switch K9, the other end of the third inductor L3 is grounded through the tenth switch K10 and connected to an anode of the third diode 1104. A cathode of the third diode 1104 is grounded through the eleventh switch K11, the cathode of the third diode 1104 is also grounded through the twelfth switch K12 and connected to the stylus housing through the twelfth switch K12. One end of the fourth inductor L4 is grounded through the thirteenth switch K13, and the other end of the fourth inductor L4 is connected to the power supply unit VCC through the fourteenth switch K14 and connected to a cathode of the fourth diode 1105. An anode of the fourth diode 1105 is connected to the power supply unit VCC through the fifteenth switch K15, the anode of the fourth diode 1105 is also connected to the power supply unit VCC through the sixteenth switch K16 and connected to the stylus housing through the sixteenth switch K16.

It should be understood that, in the positive and negative voltage driving circuit, the above-mentioned switches may be MOS transistors, and each MOS transistor has its own parasitic capacitance. And in practical applications, the smaller the parasitic capacitance, the better the performance of the MOS transistor. Specifically, the ninth switch K9, the twelfth switch K12, the fourteenth switch K14 and the fifteenth switch K15 may be PMOS devices, and the tenth switch K10, the eleventh switch K11, the thirteenth switch K13 and the sixteen switch K16 may be NMOS devices.

In an example, the driving module 1113 and the driving module 1112 may be the same driving module. The driving module 1113, the driving module 1112 and the MCU 1111 may be integrated in a chip, and the square wave may be output directly at the IO port of the chip; however, it is not limited to this, the MCU1111, the driving module 1112 and the driving module 1113 may also be provided separately, and the control module 1110 outputs the square wave through the driving module.

Figure 12:
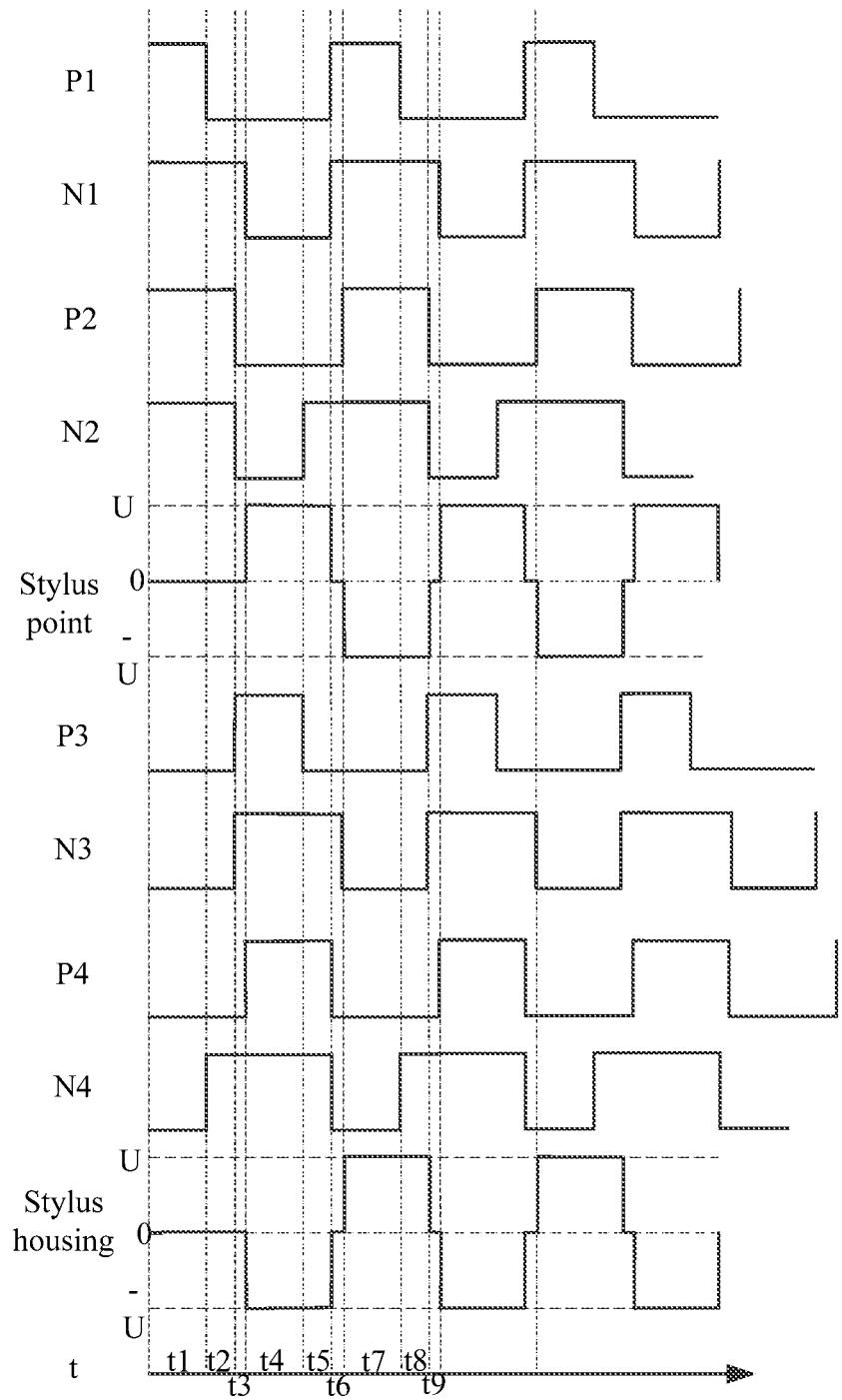
FIG. 12 illustrates an operation waveform diagram of the positive and negative voltage driving circuit of the embodiment in FIG. 11 of the present disclosure.

As shown in FIG. 12, the states of the fifth control signal P3, the sixth control signal N3, the seventh control signal P4, and the eighth control signal N4 are mainly divided into 9 stages. In a first stage, the fifth control signal P3 is at a low level, the sixth control signal N3 is at a low level, the seventh control signal P4 is at a low level, and the eighth control signal N4 is at a low level. In a second stage, the fifth control signal P3 is at a low level, the sixth control signal N3 is at a low level, the seventh control signal P4 is at a low level, and the eighth control signal N4 is at a high level. In a third stage, the fifth control signal P3 is at a high level, and the sixth control signal N3 is at a high level, the seventh control signal P4 is at a low level, and the eighth control signal N4 is at a high level. In a fourth stage, the fifth control signal P3 is at a high level, the sixth control signal N3 is at a high level, the seventh control signal P4 is at a high level, and the eighth control signal N4 is at a high level. In a fifth stage, the fifth control signal P3 is at a low level, the sixth control signal N3 is at a high level, the seventh control signal P4 is at a high level, and the eighth control signal N4 is at a high level. In a sixth stage, the fifth control signal P3 is at a low level, the sixth control signal N3 is at a high level, the seventh control signal P4 is at a low level, and the eighth control signal N4 is at a low level. In a seventh stage, the fifth control signal P3 is at a low level, the sixth control signal N3 is at a low level, the seventh control signal P4 is at a low level, and the eighth control signal N4 is at a low level. In an eighth stage, the fifth control signal P3 is at a low level, the sixth control signal N3 is at a low level, the seventh control signal P4 is at a low level, and the eighth control signal N4 is at a high level. In a ninth stage, the fifth control signal P3 at a high level, the sixth control signal N3 is at a high level, the seventh control signal P4 is at a low level, and the eighth control signal N4 is at a high level. The nine stages are explained as below.

In t1 stage, the fifth control signal P3 is at a low level, the sixth control signal N3 is at a low level, the seventh control signal P4 is at a low level, and the eighth control signal N4 is at a low level. That is, the ninth switch K9 is turned on, the tenth switch K10 and the eleventh switch K11 are turned off, the fourteenth switch K14 and the fifteenth switch K15 are turned on, and the thirteenth switch K13 is turned off. The voltage at a point A' is 0, the voltage at a point B' is VCC, and the voltage at the stylus housing is close to 0.

In t2 stage, the fifth control signal P3 is at a low level, the sixth control signal N3 is at a low level, the seventh control signal P4 is at a low level, and the eighth control signal N4 is at a high level. That is, the ninth switch K9 is turned on, the tenth switch K10 and the eleventh switch K11 are turned off, the fourteenth switch K14 and the fifteenth switch K15 are turned on, and the thirteenth switch K13 is turned on. The voltage at the point A' is 0, the voltage at the point B' is VCC, and the voltage at the stylus housing is 0. The power supply unit VCC charges the fourth inductor L4, and the voltage at the stylus housing is close to 0.

In t3 stage, the fifth control signal P3 is at a high level, the sixth control signal N3 is at a high level, the seventh control signal P4 is at a low level, and the eighth control signal N4 is at a high level. That is, the ninth switch K9 is turned off, the tenth switch K10 and the eleventh switch K11 are turned on, the fourteenth switch K14 and the fifteenth switch K15 are turned on, and the thirteenth switch K13 is turned on. The power supply unit VCC continues to charge the fourth inductor L4. The voltage at the point A' is 0, the voltage at the stylus housing remains 0, and the state remains unchanged. The longer the total time of t2+t3, the more energy the fourth inductor L4 accumulates.

In t4 stage, the fifth control signal P3 is at a high level, the sixth control signal N3 is at a high level, the seventh control signal P4 is at a high level, and the eighth control signal N4 is at a high level. That is, the ninth switch K9 is turned off, the tenth switch K10 and the eleventh switch K11 are turned on, the fourteenth switch K14 and the fifteenth switch K15 are turned off, and the thirteenth switch K13 is turned on. The voltage at the point A' is 0. The energy stored by the fourth inductor L4 in the t2+t3 stage is transferred to the parasitic capacitor of the fourteenth switch K14 and the parasitic capacitor of the fifteenth switch K15, so that the voltage for the parasitic capacitor increases in a negative direction. When the negative voltage at the point B' increases to be greater than the turned-on voltage of the sixteenth switch K16, the sixteenth switch K16 turns on, and the energy stored in the fourth inductor L4 is transferred to the capacitor C of the stylus housing, so that the voltage at the stylus housing increases in a negative direction to voltage–U.

In t5 stage, the fifth control signal P3 is at a low level, the sixth control signal N3 is at a high level, the seventh control signal P4 is at a high level, and the eighth control signal N4 is at a high level. That is, the ninth switch K9 is turned on, the tenth switch K10 and the eleventh switch K11 are turned on, the fourteenth switch K14 and the fifteenth switch K15 are turned off, and the thirteenth switch K13 is turned on. The voltage at the point A' is still 0. The power supply unit VCC charges the third inductor L3 through the ninth switch K9, and is grounded through the tenth switch K10. The voltage at the stylus housing remains–U.

In t6 stage, the fifth control signal P3 is at a low level, the sixth control signal N3 is at a high level, the seventh control signal P4 is at a low level, and the eighth control signal N4 is at a low level. That is, the ninth switch K9 is turned on, the tenth switch K10 and the eleventh switch K11 are turned on, the fourteenth switch K14 and the fifteenth switch K15 are turned on, and the thirteenth switch K13 is turned off. The voltage at the point A' is 0 and the voltage at the point B' is VCC. The voltage U at the stylus housing rises from –U to close to VCC through the body diode of the twelfth switch K12. The power supply unit VCC charges the third inductor L3 through the ninth switch K9, and is grounded through the tenth switch K10. The longer the total time of t5+t6 stage is, the more energy the third inductor L3 accumulates. Since the voltage at the point B' is VCC and the voltage at the point A' is 0V, the voltage at the point B' passes through the body diode of the sixteenth switch K16 and the body diode of the twelfth switch K12, and discharges to the ground through the eleventh switch K11, causing electric leakage, the time of the t6 stage shall be controlled to be as short as possible and the t6 stage is not even needed.

In t7 stage, the fifth control signal P3 is at a low level, the sixth control signal N3 is at a low level, the seventh control signal P4 is at a low level, and the eighth control signal N4 is at a low level. That is, the ninth switch K9 is turned on, the tenth switch K10 and the eleventh switch K11 are turned off, the fourteenth switch K14 and the fifteenth switch K15 are turned on, and the thirteenth switch K13 is turned off. The energy stored in the third inductor L3 in the t5+t6 stage is transferred to the parasitic capacitor of the tenth switch K10 and the parasitic capacitor of the eleventh switch K11, so that the voltage for the capacitor increases in a positive direction. When the positive voltage at the point A' increases to be greater than the turn-on voltage of the twelfth switch K12, the twelfth switch K12 turns on, and the energy stored in the third inductor 3 is transferred to the capacitor C of the stylus housing, so that the voltage in the stylus housing increases in a positive direction to the voltage U.

In t8 stage, the fifth control signal P3 is at a low level, the sixth control signal N3 is at a low level, the seventh control signal P4 is at a low level, and the eighth control signal N4 is at a high level. That is, the ninth switch K9 is turned on, the tenth switch K10 and the eleventh switch K11 are turned off, the fourteenth switch K14 and the fifteenth switch K15 are turned on, and the thirteenth switch K13 is turned on. The voltage at the point A' is U, and the voltage at the stylus housing is U. The power supply unit VCC charges the fourth inductor L4 through the fourteenth switch K14, and is grounded through the thirteenth switch K13.

In t9 stage, the fifth control signal P3 is at a high level, the sixth control signal N3 is at a high level, the seventh control signal P4 is at a low level, and the eighth control signal N4 is at a high level. That is, the ninth switch K9 is turned off, the tenth switch K10 and the eleventh switch K11 are turned on, the fourteenth switch K14 and the fifteenth switch K15 are turned on, and the thirteenth switch K13 is turned on. The voltage at the point B' is VCC. The voltage U at the stylus housing drops from U to close to VCC through the body diode of the six switch K16. The power supply unit VCC charges the fourth inductor L4 through the fourteenth switch K14, and is grounded through the thirteenth switch K13. The longer the total time of T8+t9 stage is, the more energy the fourth inductor L4 accumulates. Since the voltage at the point B' is VCC, the voltage at the point A' is 0V, and the voltage at the point B' passes through the body diode of the sixteenth switch K16 and the body diode of the twelfth switch K12, and discharges to the ground through the eleventh switch K11, causing electric leakage, the t9 stage shall be controlled to be as short as possible, and the t9 stage is not even needed.

In the embodiment of the present disclosure, the first positive and negative voltage generating module 1102 and the second positive and negative voltage generating module 1103 may only need the input voltage value of the power supply unit VCC to be U to achieve the effect of the active stylus outputting a driving voltage of 4 U. Under the condition that the positive and negative voltage driving circuits consume the same power consumption, the driving voltage output by the active stylus is four times the driving voltage of the existing technology, thereby realizing high-voltage driving. In other words, under the same driving effect, that is, the stylus tip of the active stylus outputs the same voltage difference, the power consumption of the positive and negative voltage driving circuit of the embodiments of the present disclosure is only a quarter of the power consumption of the high-voltage generating circuit of the existing technology, which significantly reduce the driving power consumption of the active stylus.

This circuit controls the magnitude of the output voltage U by adjusting the time of the t2+t3 stage and the t5+t6 stage, which may realize adjustable amplitude. The smaller the total time of the t1-t8 stages, the higher the frequency; the larger the total time of the t1-t8 stages, the smaller the frequency. By adjusting the time of the t1-t8 stages, the frequency may be adjusted.

That the control module 1101 controls the switch module does not have to include the above 9 stages, but the fourth stage, the fifth stage, the seventh stage and the eighth stage shall be included. The initial stage includes the first stage, the second stage, and the third stage, and the second stage shall be included.

Compared with the existing technology, the boosting circuit and control method for the switch module provided by the embodiments of the present disclosure requires half of the power consumption of the existing technology. The boost to high voltage can be achieved by inputting a low DC voltage through the power supply unit, and the design is simple. The DC voltage input by the power supply unit in the positive and negative voltage driving circuit may only need to meet half of that in the existing technology, and the power supply unit is not required to generate high voltages, which reduces the design difficulty of the power supply unit. The withstand voltage capability of the device required by the positive and negative voltage driving circuit no longer needs to be so high, which reduces the performance requirements for the device.

Figure 13:
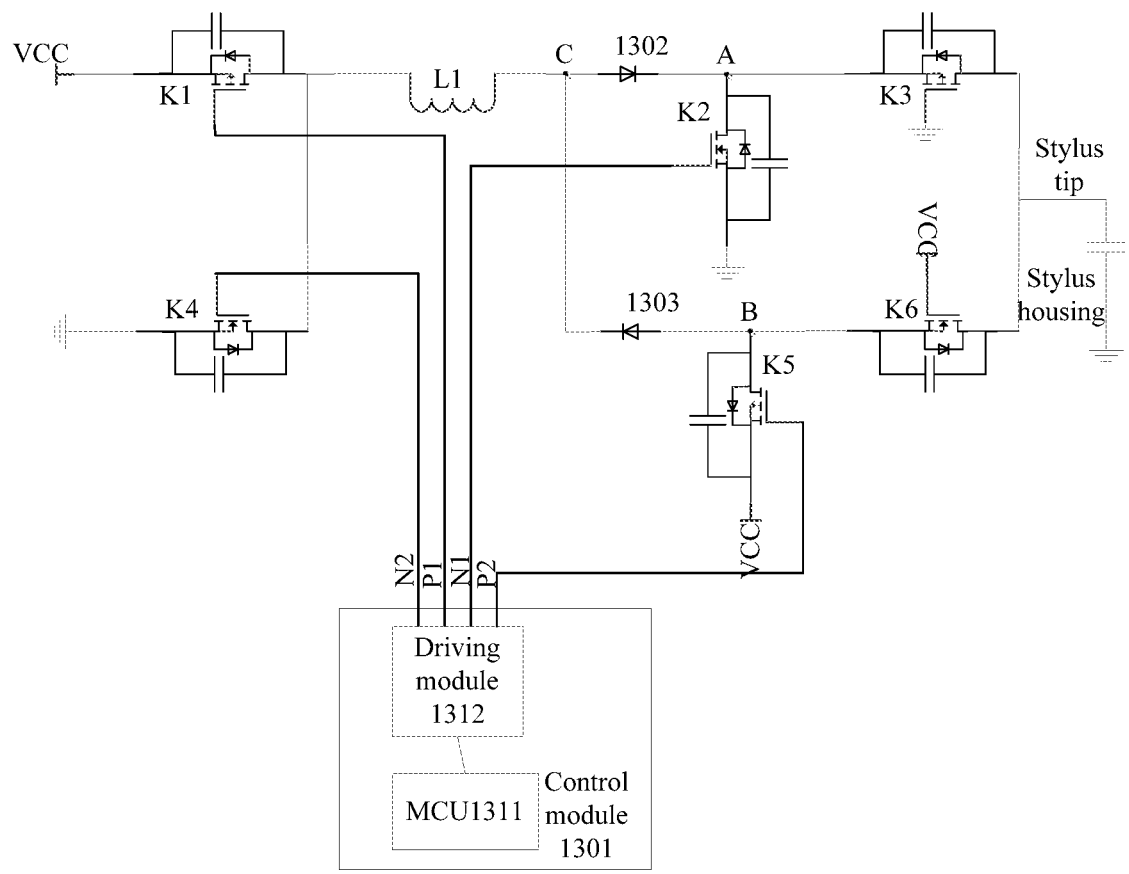
FIG. 13 illustrates a structure diagram of a positive and negative voltage driving circuit according to another embodiment of the present disclosure.

FIG. 13 is a schematic diagram of a positive and negative voltage driving circuit according to another embodiment of the present disclosure. As shown in FIG. 13, the positive and negative voltage driving circuit includes a positive and negative voltage generating module and a control module 1301, and the positive and negative voltage generating module includes a switch module. The positive and negative voltage generating module also includes a first positive voltage generating module and a first negative voltage generating module. The first positive voltage generating module includes a first boosting unit, and the first boosting unit includes a first inductor L1 and a first diode 1302. The first negative voltage generating circuit includes a second boosting unit, and the second boosting unit includes the first inductor L1 and a second diode 1303. The switch module includes at least a first switch K1, a second switch K2, a third switch K3, a fourth switch K4, a fifth switch K5 and a sixth switch K6. The switches in the embodiment of the present disclosure may be field effect transistors. Since the field effect transistor itself has parasitic capacitor, the parasitic capacitor is connected in parallel with the switch; or, the first boosting circuit and the second boosting circuit may be provided with a physical capacitor connected in parallel with each switch. In this way, the capacitance of the first boosting circuit and the second boosting circuit refers to the total capacitance after the physical capacitor is connected in parallel with the parasitic capacitor of the switch itself. In the following content, the embodiments of the present disclosure take the parasitic capacitor of the field effect transistor itself as an example for description.

The control module 1301 is connected to a control terminal of the switch module, and the control module 1301 is configured to control the state of each switch in the switch module. In this embodiment, the control module 1301 includes an MCU 1311 and a driving module 1312; the driving module 1312 is connected to the control terminal of the switch module for driving the switch module; the MCU 1311 is connected to the driving module 1312 and is configured to control the driving manner of the driving module 1312, so that the driving module 1312 may generate a square wave with a certain duty cycle to control the switch module. The MCU 1311 is configured to control the driving module 1312 to output a first control signal P1, a second control signal N1, a third control signal P2 and a fourth control signal N2 to the switch module. The first control signal P1 is configured to control the turn-off state and the turn-on state of the first switch, the second control signal N1 is configured to control the turn-off state and the turn-on state of the second switch and the turn-off state and the turn-on state of the third switch, the third control signal P2 is configured to control the turn-off state and the turn-on state of the sixth switch and the turn-off state and the turn-on state of the seventh switch, and the fourth control signal N2 is configured to control the turn-off state and the turn-on state of the fifth switch. In this way, the first switch, the second switch, the third switch, the fourth switch, the fifth switch and the sixth switch are alternately turned on, to generate a positive voltage and a negative voltage alternately between the stylus tip and the stylus housing.

Specifically, the first switch is controlled by the first control signal P1, the second switch is controlled by the second control signal N1, the fifth switch is controlled by the third control signal P2, and the fourth switch is controlled by the fourth control signal N2. One end of the first inductor L1 is connected to a power supply unit VCC through the first switch K1, and the other end of the first inductor L1 is connected to an anode of the first diode 1302 and a cathode of the second diode 1303. A cathode of the first diode 1302 is grounded through the second switch, the cathode of the first diode 1302 is connected to one end of the third switch, and the other end of the third switch is connected to the stylus tip. A control terminal of the third switch is grounded. A anode of the second diode 1303 is connected to the power supply VCC through the fifth switch, and the anode of the second diode 1303 is connected to the stylus tip through the sixth switch. A control terminal of the sixth switch is connected to the power supply unit.

It should be understood that in the positive and negative voltage driving circuit, each of the above switches may be metal oxide semiconductor (MOS) transistors, each MOS transistor has its own parasitic capacitance, and in practical applications, the smaller the parasitic capacitance is, the better the performance of the MOS transistors is. Specifically, the second switch K2, the fourth switch K4 and the sixth switch K6 may be NMOS devices, and the first switch K1, the third switch K3 and the fifth switch K5 may be PMOS devices.

In an example, the driving circuit 1312 and the MCU1311 may be integrated in a chip, and the square wave may be output directly at the IO port of the chip; however, it is not limited to this, the MCU1311 and the driving circuit 42 may also be set separately, and the MCU1311 may output the square wave through the driving module 1312.

Figure 14:
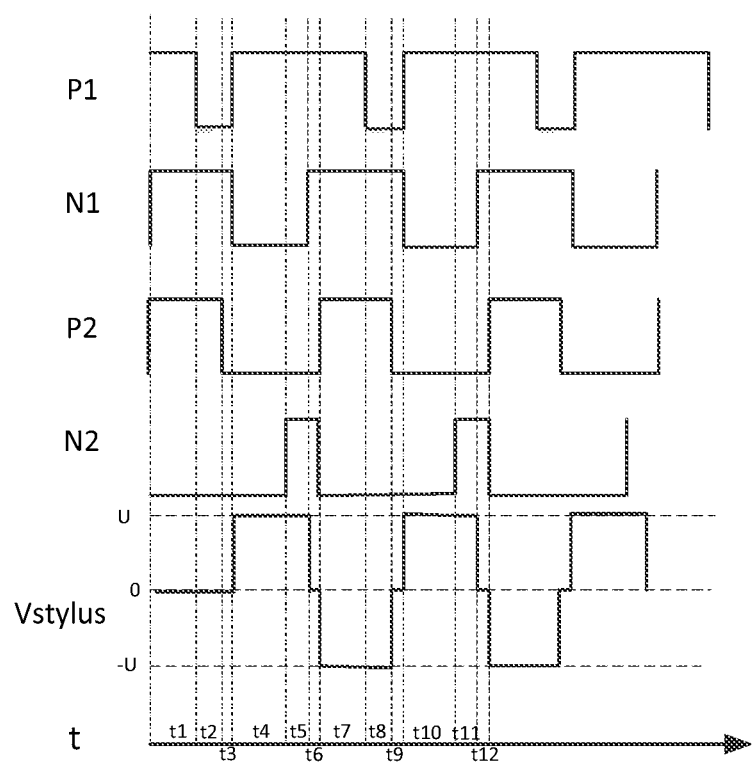
FIG. 14 illustrates an operation waveform diagram of the positive and negative voltage driving circuit of the embodiment in FIG. 13 of the present disclosure.

As shown in FIG. 14, the states of the first control signal P1, the second control signal N1, the third control signal P2 and the fourth control signal N2 are mainly divided into nine stages. In a first stage, the first control signal P1 is at a high level, the second control signal N1 is at a high level, the third control signal P2 is at a high level, and the fourth control signal N2 is at a low level. In a second stage, the first control signal P1 is at a low level, the second control signal N1 is at a high level, the third control signal P2 is at a high level, and the fourth control signal N2 is at a low level. In a third stage, the first control signal P1 is at a low level, the second control signal N1 is at a high level, the third control signal P2 is at a low level, and the fourth control signal N2 is at a low level. In a fourth stage, the first control signal P1 is at a high level, the second control signal N1 is at a low level, the third control signal P2 is at a low level, and the fourth control signal N2 is at a low level. In a fifth stage, the first control signal P1 is at a high level, the second control signal N1 is at a low level, the third control signal P2 is at a low level and the fourth control signal N2 is at a high level. In a sixth stage, the first control signal P1 is at a high level, the second control signal N1 is at a high level, the third control signal P2 is at a low level, and the fourth control signal N2 is at a high level. In a seventh stage, the first control signal P1 is at a high level, the second control signal N1 is at a high level, the third control signal P2 is at a high level, and the fourth control signal N2 is at a low level. In an eighth stage, the first control signal P1 is at a low level, the second control signal N1 is at a high level, the third control signal P2 is at a high level, and the fourth control signal N2 is at a low level. In a ninth stage, the first control signal P1 is at a low level, the second control signal N1 is at a high level, the third control signal P2 is at a low level, and the fourth control signal N2 is at a low level. The nine stages are explained as below.

In t1 stage, the first control signal P1 is at a high level, the second control signal N1 is at a high level, the third control signal P2 is at a high level, and the fourth control signal N2 is at a low level. That is, the first switch is turned off, the second switch is turned on, the fourth switch and the fifth switch are turned off. The voltage at a point A is 0, and the third switch K3 is turned off; the voltage at a point B is 0, and the sixth switch K6 is turned on.

In t2 stage, the first control signal P1 is at a low level, the second control signal N1 is at a high level, the third control signal P2 is at a high level, and the fourth control signal N2 is at a low level. That is, the first switch is turned on, the second switch is turned on, the fifth switch is turned off, and the fourth switch is turned off. The voltage at the stylus tip is 0. The power supply unit VCC discharges to the ground through the first switch K1, the first inductor L1, the first diode 1302 and the second switch K2. The power supply unit VCC charges the first inductor L1. The voltage at the point A is 0, and the third switch K3 is turned off; the voltage at the point B is 0, and the sixth switch K6 is turned on.

In t3 stage, the first control signal P1 is at a low level, the second control signal N1 is at a high level, the third control signal P2 is at a low level, and the fourth control signal N2 is at a low level. That is, the first switch K1 is turned on, the second switch K2 is turned on, the fifth switch K5 is turned on, and the fourth switch K4 is turned off. The power supply unit VCC discharges through the first switch K1, the first inductor L1, the first diode 1302 and the second switch K2. The power supply unit VCC continues to charge the first inductor L1. The voltage at the point A is 0, and the third switch K3 is turned off; the voltage at the point B is VCC, and the voltage at the point B is grounded through the second diode 1303, the first diode 1302 and the second switch K2, causing electric leakage. Therefore, the time of the t3 stage should be controlled to be as short as possible, and the t3 stage is not even needed.

In t4 stage, the first control signal P1 is at a high level, the second control signal N1 is at a low level, the third control signal P2 is at a low level, and the fourth control signal N2 is at a low level. That is, the first switch is turned off, the second switch 405 is turned off, the fifth switch is turned on, and the fourth switch 404 is turned off. In t2+t3 stage, the energy accumulated in the first inductor L1 is transferred to the parasitic capacitor of the second switch K2 through the body diode of the fourth switch K4, the first inductor L1 and the first diode 1302, so that the voltage for capacitor increases in a positive direction. When the voltage at the point A increases to be greater than the turn-on voltage of the third switch K3, the third switch K3 turns on, the energy stored by the first inductor L1 is transferred to the capacitor C of the stylus tip, and the voltage at the stylus tip increases to U; the fifth switch K5 remains turns on, the voltage at the point B is VCC, the sixth switch K6 is turned off, and the second diode 1303 is also reversely turned off.

In t5 stage, the first control signal P1 is at a high level, the second control signal N1 is at a low level, the third control signal P2 is at a low level, and the fourth control signal N2 is at a high level. That is, the first switch K1 is turned off, the second switch K2 is turned off, the fifth switch K5 is turned on, and the fourth switch K4 is turned on. The power supply unit VCC discharges to the ground through the fifth switch K5, the first diode 1302, the first inductor L1 and the fourth switch K4. The power supply unit VCC charges the first inductor L1. The voltage at the point B is VCC, and the switch K6 remains turned off; the voltage at tip C is less than VCC, and the voltage at the point A is close to U. The first diode 1302 is reversely turned off.

In t6 stage, the first control signal P1 is at a high level, the second control signal N1 is at a high level, the third control signal P2 is at a low level, and the fourth control signal N2 is at a high level. That is, the first switch is turned off, the second switch is turned on, the fifth switch is turned on, and the fourth switch is turned on. The power supply unit VCC discharges to the ground through the fifth switch K5, the first diode 1302, the first inductor L1 and the fourth switch K4. The power supply unit VCC continues to charge the first inductor L1. The voltage at the point B is VCC, and the sixth switch K6 remains turned off; the voltage at a point C is less than VCC, and the switch K2 changes from turn-off to turn-on. The voltage at the point A is 0, and the voltage at the stylus tip U is pulled to the ground; the voltage at tip B is grounded through the second diode 1303, the first diode 1302 and the second switch K2, causing electric leakage. Therefore, the time of the t6 stage should be controlled to be as short as possible, and the t6 stage is not even needed. The main purpose of T6 stage is to release the positive voltage at the stylus tip.

In t7 stage, the first control signal P1 is at a high level, the second control signal N1 is at a high level, the third control signal P2 is at a high level, and the fourth control signal N2 is at a low level. That is, the first switch is turned off, the second switch 405 is turned on, the fifth switch is turned off, and the fourth switch 404 is turned off. The energy accumulated on the first inductor L1 in the t5+t6 stage is transferred to the parasitic capacitor of the fifth switch K5 through VCC, the body diode of the first switch K1, and the first inductor L1 and the second diode 1303, so that the voltage for the capacitor increases in a negative direction. When the negative voltage at the point A increases to be greater than the turn-on voltage of the sixth switch K6, the sixth switch K6 turns on. The energy stored in the inductor L1 is transferred to the capacitor C of the stylus tip, and the voltage at the stylus tip increases to −U; the second switch K2 remains turns on, the voltage at the point A is 0, the third switch K3 is turned off, and the first diode 1302 is also reversely turned off.

In t8 stage, the first control signal P1 is at a low level, the second control signal N1 is at a high level, the third control signal P2 is at a high level, and the fourth control signal N2 is at a low level. That is, the first switch is turned on, the second switch is turned on, the fifth switch is turned off, and the fourth switch is turned off. The power supply VCC discharges to the ground through the first switch K1, the first inductor L1, the first diode 1302 and the second switch K2. The power supply unit VCC charges the first inductor L1. The voltage at the point A is 0, and the third switch K3 is turned off; the fourth switch K4 and the fifth switch K5 are turned off, the voltage at the stylus tip is −U, the voltage at the point B is slightly greater than −U, and the sixth switch K6 is turned off.

In t9 stage, the first control signal P1 is at a low level, the second control signal N1 is at a high level, the third control signal P2 is at a low level, and the fourth control signal N2 is at a low level. That is, the first switch is turned on, the second switch 405 is turned on, the fifth switch is turned on, and the fourth switch 404 is turned off. The power supply VCC discharges to the ground through the first switch K1, the first inductor L1, the first diode 1302 and the second switch K2. The power supply VCC continues to charge the first inductor L1. The voltage at the point A is 0, and the third switch K3 is turned off; the voltage at the point B is VCC, and the voltage at the point B is grounded through the second diode 1303, the first diode 1302, and the second switch K2 and the voltage at the point B is grounded through the body diode of the sixth switch K6, the stylus tip and the body diode of the third switch K3. The voltage at the stylus tip is slightly less than the VCC voltage, and both paths electric leak. Therefore, the time of the t9 stage should be controlled to be as short as possible, and the t9 stage is not even needed. The main purpose of the t9 stage is to release the voltage at the stylus tip.

Compared with the previous embodiment, that is, compared with the circuit and method described in FIG. 9 and FIG. 10, the boosting circuit provided by the embodiment of the present disclosure and the method for controlling the switch module have slightly higher power consumption, which mainly depends on the type of the diode selected. The diode preferably selects a low conduction voltage and a high withstand voltage. The advantage of the embodiment of the present disclosure is that only one inductor is needed, which saves cost. Compared with the existing technology, the voltage may be boosted to a high voltage through a low voltage, and the design is simple. This circuit controls the magnitude of the positive high voltage U by adjusting and controlling the total time of the t2 stage and the t3 stage, and controls the magnitude of the negative high voltage−U by controlling the total time of the t5 stage and the t6 stage. By adjusting the time of the t1-t8 stages, the frequency may be adjusted.

Figure 15:
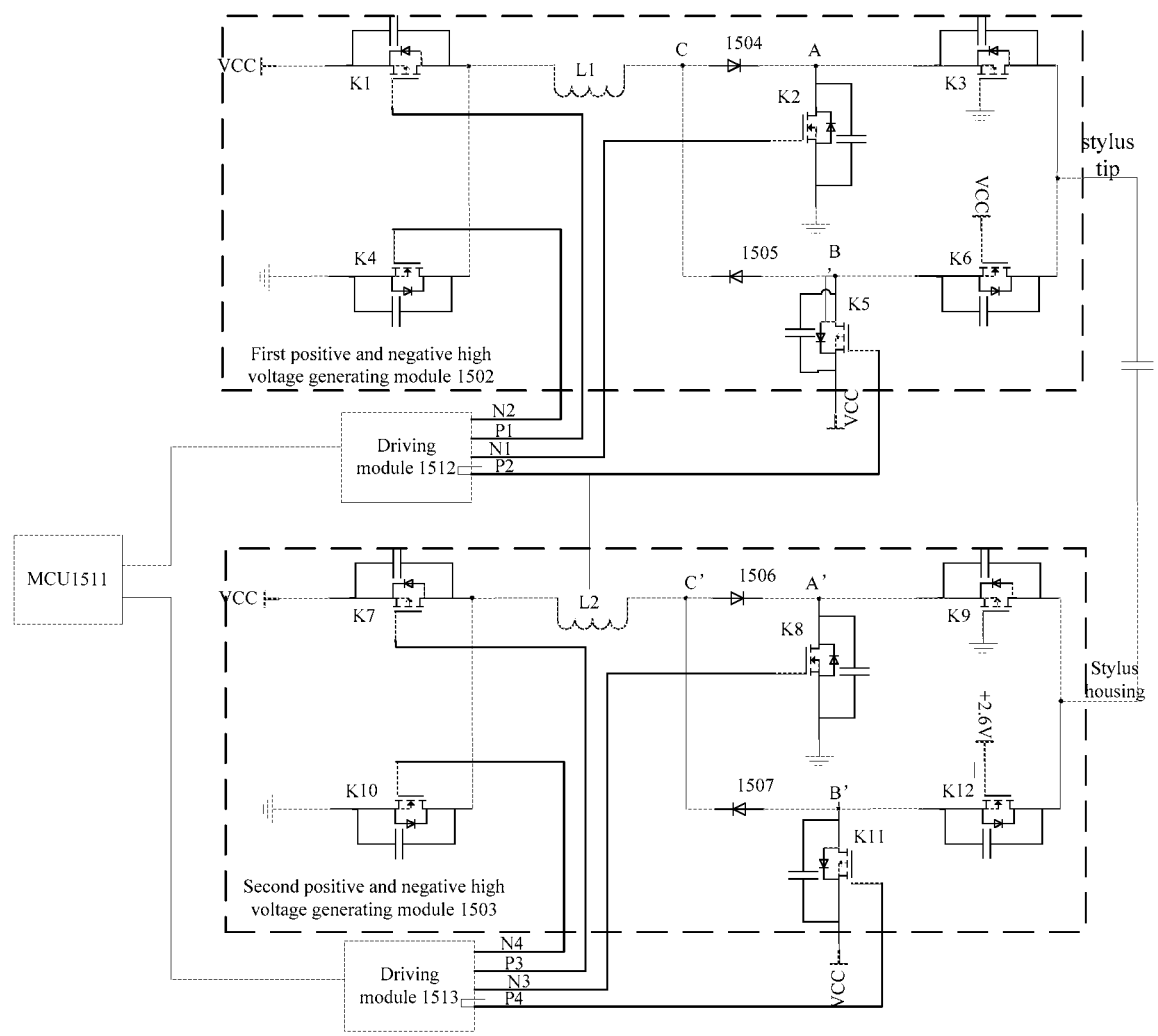
FIG. 15 illustrates a structure diagram of a positive and negative voltage driving circuit according to another embodiment of the present disclosure.

FIG. 15 is a schematic diagram of a floating positive and negative voltage driving circuit according to another embodiment of the present disclosure. As shown in FIG. 15, the positive and negative voltage driving circuit includes a positive and negative voltage generating module and a control module 1501, and the positive and negative voltage generating module includes a switch module. The positive and negative voltage generating module includes a first positive and negative voltage generating module 1502 and a second positive and negative voltage generating module 1503. The first positive and negative voltage generating module 1502 includes a first positive voltage generating module and a first negative voltage generating module. The second positive and negative voltage generating module 1503 includes a second positive voltage generating module and a second negative voltage generating module. The first positive voltage generating module and the first negative voltage generating module are similar to those in FIG. 13 and will not be discussed in detail here.

The second positive voltage generating module includes a third boosting unit, and the third boosting unit includes a second inductor L2 and a third diode 1506. The second negative voltage generating circuit includes a fourth boosting unit, and the fourth boosting unit includes a second inductor and a fourth diode 1507. The switch module also includes a ninth switch K9, a tenth switch K10, an eleventh switch K11, a twelfth switch K12, a thirteenth switch K13, a fourteenth switch K14, a fifteenth switch K15 and a sixteenth switch K16. Since the field effect transistor itself has a parasitic capacitor, the parasitic capacitor is connected in parallel with the switch (field effect transistor); or, the third boosting circuit and the fourth boosting circuit may be provided with a physical capacitor connected in parallel with each switch. In this way, the capacitance of the third boosting circuit and the fourth boosting circuit refers to the total capacitance after the physical capacitor is connected in parallel with the parasitic capacitor of the switch (field effect transistor) itself. In the following content, the embodiments of the present disclosure take the parasitic capacitor of the field effect transistor itself as an example for description.

The control module is connected to a control terminal of the switch module, and the control module is configured to control the state of each switch in the switch module. In this embodiment, the control module includes an MCU 1511, a driving module 1512 and a driving module 1513; the driving module 1512 and the driving module 1513 are connected to the control terminal of the switch module for driving the switch module; the connection manner and the control method of the driving module 1512 and the MCU 1511 have been explained in FIG. 9 and will not be described in detail here. The MCU 1511 is connected to the driving module 1513 and is configured to control the driving manner of the driving module 1513, so that the driving module 1513 may generate a square wave with a certain duty cycle to control the switch module.

The MCU is configured to control the driving module 1513 to output a fifth control signal, a sixth control signal, a seventh control signal and an eighth control signal to the switch module. The fifth control signal is configured to control the turn-off state and the turn-on state of the seventh switch K7, the sixth control signal is configured to control the turn-off state and the turn-on state of the eighth switch K8, the seventh control signal is configured to control the turn-off state and the turn-on state of the eleventh switch K1, and the eighth control signal is configured to control the turn-off state and the turn-on state of the tenth switch K10. The first switch K7, the eighth switch K8, the ninth switch K9, the tenth switch K10, the eleventh switch K11 and the twelfth switch K12 are alternately turned on, to generate a positive voltage and a negative voltage alternately between the stylus tip and the stylus housing.

Specifically, the seventh switch K7 is controlled by the fifth control signal P3, the eighth switch K8 is controlled by the sixth control signal N3, the eleventh switch K11 is controlled by the seventh control signal P4, and the tenth switch K10 is controlled by the eighth control signal N4. One end of the second inductor L2 is connected to a power supply unit VCC through the seventh switch K7, and the other end of the second inductor L2 is connected to an anode of the third diode 1506 and a cathode of the fourth diode 1507. A cathode of the third diode 1506 is grounded through the eighth switch, the cathode of the third diode 1506 is also connected to one end of the ninth switch, and the other end of the ninth switch is connected to the stylus housing. A control terminal of the ninth switch is grounded. An anode of the fourth diode 1507 is connected to the power supply unit VCC through the eleventh switch, and the anode of the fourth diode 1507 is also connected to the stylus housing through the twelfth switch. A control terminal of the twelfth switch is connected to the power supply unit.

It should be understood that, in the positive and negative voltage driving circuit, the above-mentioned switches may be MOS transistors, and each MOS transistor has its own parasitic capacitance, and in practical applications, the smaller the parasitic capacitance is, the better the performance of the MOS transistor is. Specifically, the eighth switch K8, the tenth switch K10 and the twelfth switch K12 may be NMOS devices, and the seventh switch K7, the ninth switch K and the eleventh switch K11 may be PMOS devices.

In an example, the driving module 1513 and the driving module 1512 may be the same driving module. The driving module 1513, the driving module 1512 and the MCU 1511 may be integrated in a chip, and the square wave may be output directly at the IO port of the chip; however, it is not limited to this, MCU1511, the driving module 1512 and the driving module 1513 may also be provided separately, and the control module 1501 outputs the square wave through the driving module 1512.

Figure 16:
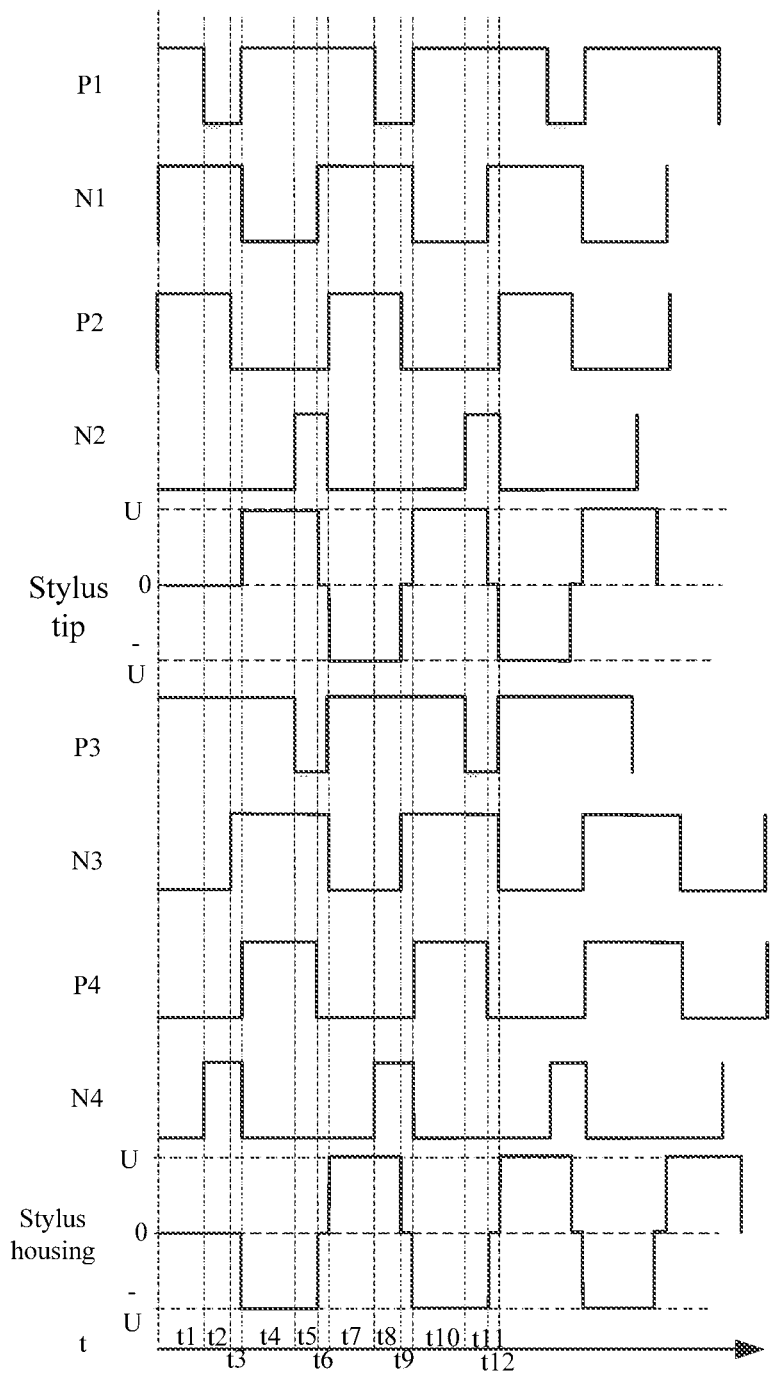
FIG. 16 illustrates an operation waveform diagram of the positive and negative voltage driving circuit of the embodiment in FIG. 15 of the present disclosure.

As shown in FIG. 16, the states of the fifth control signal P3, the sixth control signal N3, the seventh control signal P4 and the eighth control signal N4 are mainly divided into nine stages. In a first stage, the fifth control signal P3 is at a high level, the sixth control signal N3 is at a low level, the seventh control signal P4 is at a low level, and the eighth control signal N4 is at a low level. In a second stage, the fifth control signal P3 is at a high level, the sixth control signal N3 is at a low level, the seventh control signal P4 is at a low level, and the eighth control signal N4 is at a high level. In a third stage, the fifth control signal P3 is at a high level, the sixth control signal N3 is at a high level, the seventh control signal P4 is at a low level, and the eighth control signal N4 is at a high level. In a fourth stage, the fifth control signal P3 is at a high level, the sixth control signal N3 is at a high level, the seventh control signal P4 is at a high level, and the eighth control signal N4 is at a low level. In a fifth stage, the fifth control signal P3 is at a low level, the sixth control signal N3 is at a high level, the seventh control signal P4 is at a high level, and the eighth control signal N4 is at a low level. In a sixth stage, the fifth control signal P3 is at a low level, the sixth control signal N3 is at a high level, the seventh control signal P4 is at a low level, and the eighth control signal N4 is at a low level. In a seventh stage, the fifth control signal P3 is at a high level, the sixth control signal N3 is at a low level, the seventh control signal P4 is at a low level, and the eighth control signal N4 is at a low level. In an eighth stage, the fifth control signal P3 is at a high level, the sixth control signal N3 is at a low level, the seventh control signal P4 is at a low level, and the eighth control signal N4 is at a high level. In a ninth stage, the fifth control signal P3 is at a high level, the sixth control signal N3 is at a high level, the seventh control signal P4 is at a low level, and the eighth control signal N4 is at a high level. The nine stages are explained as below.

In t1 stage, the fifth control signal P3 is at a high level, the sixth control signal N3 is at a low level, the seventh control signal P4 is at a low level, and the eighth control signal N4 is at a low level. That is, the seventh switch is turned off, the eighth switch is turned off, the eleventh switch is turned on, and the tenth switch is turned off. The voltage at a point A' is 0, and the ninth switch K9 is turned off; the voltage at a point B' is VCC, and the twelfth switch K12 is turned on.

In t2 stage, the fifth control signal P3 is at a high level, the sixth control signal N3 is at a low level, the seventh control signal P4 is at a low level, and the eighth control signal N4 is at a high level. That is, the seventh switch is turned off, the eighth switch is turned off, the eleventh switch is turned on, and the tenth switch is turned on. The voltage at the stylus tip is 0. The power supply unit VCC discharges to the ground through the eleventh switch K11, the fourth diode 1507, the second inductor L2 and the tenth switch K10. The power supply unit VCC charges the second inductor L2. The voltage at the point A' is 0, and the ninth switch K9 is turned off; the voltage at the point B' is VCC, and the twelfth switch K12 is turned on. The voltage at the stylus housing is close to 0.

In t3 stage, the fifth control signal P3 is at a high level, the sixth control signal N3 is at a high level, the seventh control signal P4 is at a low level, and the eighth control signal N4 is at a high level. That is, the seventh switch is turned off, the eighth switch is turned on, the eleventh switch is turned on, and the tenth switch is turned on. The power supply unit VCC discharges to the ground through the eleventh switch K11, the fourth diode 1507, the second inductor L2 and the tenth switch K10. The power supply unit VCC continues to charge the second inductor L2. The voltage at the point A' is 0, and the ninth switch K9 is turned off; the voltage at the point B' is VCC, and the voltage at the point B' is grounded through the fourth diode 1507, the third diode 1506 and the eighth switch K8, causing electric leakage. Therefore, the time of the t3 stage should be controlled to be as short as possible, and the t3 stage is not even needed.

In t4 stage, the fifth control signal P3 is at a high level, the sixth control signal N3 is at a high level, the seventh control signal P4 is at a high level, and the eighth control signal N4 is at a low level. That is, the seventh switch is turned off, the eighth switch is turned on, the eleventh switch is turned off, and the tenth switch is turned off. In t2+t3 stage, the energy accumulated in the second inductor L3 is transferred to the parasitic capacitor of the eleventh switch K11 through the body diode of the tenth switch K10, the second inductor L2 and the fourth diodes 1507, so that the voltage for the capacitor increases in a negative direction. When the negative voltage at the point B' increases to be greater than the turn-on voltage of the twelfth switch K12, the twelfth switch K12 turns on, the energy stored in the second inductor L2 is transferred to the capacitor C of the stylus housing, and the voltage at the stylus housing increases in a negative direction to –U. The eighth switch K8 remains turned on, the voltage at the point A' is 0, and the ninth switch K9 is turned off. The third diode 1506 is also reversely turned off.

In t5 stage, the fifth control signal P3 is at a low level, the sixth control signal N3 is at a high level, the seventh control signal P4 is at a high level, and the eighth control signal N4 is at a low level. That is, the seventh switch is turned on, the eighth switch is turned on, the eleventh switch is turned off, and the tenth switch is turned off. The power supply unit VCC discharges to the ground through the seventh switch K7, the second inductor L2, the third diode 1506 and the eighth switch K8. The power supply unit VCC charges the second inductor L2. The voltage at the point A' is VCC, and the ninth switch K9 remains turned on; the voltage at a point C is less than VCC, the voltage at the point B' is –U, and the fourth diode 1507 is reversely turned off.

In t6 stage, the fifth control signal P3 is at a low level, the sixth control signal N3 is at a high level, the seventh control signal P4 is at a low level, and the eighth control signal N4 is at a low level. That is, the seventh switch is turned on, the eighth switch is turned on, the eleventh switch is turned on, and the tenth switch is turned off. The power supply unit VCC discharges to the ground through the seventh switch K7, the first inductor L1, the third diode 1506 and the eighth switch K8. The power supply unit VCC continues to charge the second inductor L2. The voltage at the point A' is 0, and the ninth switch K9 remains turned off; the voltage at the point C' is less than VCC, and the eleventh switch K11 changes from turn-off to turn-on. The voltage at the point B' is VCC, the voltage at the stylus housing is pulled from –U to close to VCC. The voltage at the point B' is grounded through the fourth diode 1507, the third diode 1506 and the eighth switch K8, causing electric leakage. Therefore, the time of the t6 stage should be controlled to be as short as possible, and the t6 stage is not even needed. The main purpose of the t6 stage is to release the negative voltage at the stylus tip.

In t7 stage, the fifth control signal P3 is at a high level, the sixth control signal N3 is at a low level, the seventh control signal P4 is at a low level, and the eighth control signal N4 is at a low level. That is, the seventh switch is turned off, the eighth switch is turned off, the eleventh switch is turned on, and the tenth switch is turned off. The energy accumulated in the second inductor L2 in the t5+t6 stage is transferred to the parasitic capacitor of the eighth switch K8 through VCC, the body diode of the seventh switch K7, the second inductor L2 and the third diode 1506, so that the voltage for capacitor increases in a positive direction. When the positive voltage at the point A' increases to be greater than the turn-on voltage of the ninth switch K9, the ninth switch K9 turns on, the energy stored in the second inductor L2 is transferred to the capacitor C of the stylus tip, and the voltage at the stylus housing increases to U.

In t8 stage, the fifth control signal P3 is at a high level, the sixth control signal N3 is at a low level, the seventh control signal P4 is at a low level, and the eighth control signal N4 is at a high level. That is, the seventh switch is turned off, the eighth switch is turned off, the eleventh switch is turned on, and the tenth switch is turned on. The power supply unit VCC discharges to the ground through the eleventh switch K11, the fourth diode 1507, the second inductor L2 and the tenth switch K10. The power supply unit VCC charges the second inductor L2. The voltage at the point A' is U, and the ninth switch K9 is turned off; the voltage at the stylus housing is U, the voltage at the point B' is VCC which is much smaller than U, and the twelfth switch K12 is turned off.

In t9 stage, the fifth control signal P3 is at a high level, the sixth control signal N3 is at a high level, the seventh control signal P4 is at a low level, and the eighth control signal N4 is at a high level. That is, the seventh switch is turned off, the eighth switch is turned on, the eleventh switch is turned on, and the tenth switch is turned on. The power supply unit VCC discharges to the ground through the eleventh switch K11, the fourth diode 1507, the second inductor L2 and the tenth switch K10. The power supply unit VCC continues to charge the second inductor L2. The voltage at the point A' is 0, and the ninth switch K9 is turned off; the voltage at the point B' is VCC. The voltage at the point B' is grounded through the fourth diode 1507, the third diode 1506 and the eighth switch K8, and the voltage at the point B' is also grounded through the body diode of the twelfth switch K12, the stylus housing, and the body diode of the ninth switch K9. The voltage at the stylus housing is slightly less than the VCC voltage, and both paths electric leak. Therefore, the time of the t9 stage should be controlled to be as short as possible, and the t9 stage is even not needed. The main purpose of the t9 stage is to release the voltage at the stylus tip.

In the embodiment of the present disclosure, the first positive and negative voltage generating module 1502 and the second positive and negative voltage generating module 1503 may only need the input voltage value of the power supply unit VCC to be U to achieve the effect of the active stylus outputting a driving voltage of 4 U. Under the condition that the positive and negative voltage driving circuits consume the same power consumption, the driving voltage output by the active stylus is four times the driving voltage of the existing technology, thereby realizing high-voltage driving. In other words, under the same driving effect, that is, the stylus tip of the active stylus outputs the same voltage difference, the power consumption of the positive and negative voltage driving circuit of the embodiment of the present disclosure is only a quarter of that of the high-voltage generating circuit in the existing technology, which significantly reduces the driving power consumption of the active stylus.

Compared with the previous embodiment, that is, compared with the circuit and method described in FIG. 11 and FIG. 12, the boosting circuit provided by the embodiment of the present disclosure and its control method for the switch module have slightly higher power consumption, which mainly depends on the type of the diode selected. The diode preferably selects a low conduction voltage and a high withstand voltage. The advantage of the embodiment of the present disclosure is that only one inductor is needed, which saves cost. Compared with the existing technology, the voltage may be boosted to a high voltage through a low voltage, and the design is simple. This circuit controls the magnitude of the positive high voltage U by adjusting and controlling the total time of the t2 stage and the t3 stage; controls the magnitude of the negative high voltage–U by controlling the total time of the t5 stage and t6 stage; achieves adjustable frequency by adjusting the time of the t1-t4 stages.

The inductor stores energy through current, and the capacitor stores energy through voltage. In other words, the greater the current on the inductor, the greater the energy; the greater the energy on the capacitor, the greater the voltage. The formula for calculating the current on the inductor is $i=\int(U/L)dt$. It can be seen that the current on the inductor is related to time. In theory, the longer the time, the greater the current, the greater the energy, and the greater the voltage discharged to the capacitor. Therefore, by adjusting the time duty ratio of inductor charging and discharging, the voltage charged on the capacitor between the stylus tip and the stylus housing may be increased above the voltage provided by the power supply. That is, the technical solution may boost the voltage to a high voltage by the low voltage provided by the power supply, so as to obtain better driving effects, and the design is simple and easy to implement.

Optionally, the embodiments of the present disclosure also provide an active stylus. The active stylus includes the positive and negative voltage driving circuit in the foregoing various embodiments. When the active stylus contacts the touch screen of the terminal device, the positive and negative voltage driving circuit provides a driving voltage for the stylus tip of the active stylus. The active stylus also has a driving circuit and a processor such as a Micro Control Unit (MCU). Among them, each switch of the positive and negative voltage driving circuit may be driven by the processor through the driving circuit, and then controls the positive and negative voltage driving circuit to provide the driving voltage for the stylus tip of the active stylus.

Figure 17:
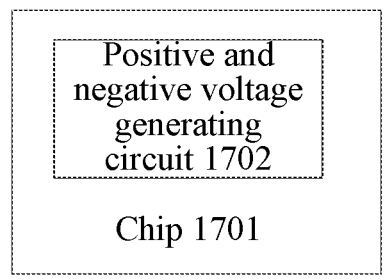
FIG. 17 illustrates a schematic structural diagram of a chip of an embodiment of the present disclosure.

FIG. 17 shows a chip of the embodiments of the present disclosure. As shown in FIG. 17, the chip 1701 includes a positive and negative voltage driving circuit 1702 which is the positive and negative voltage driving circuit of any one of the above embodiments.

Figure 18:
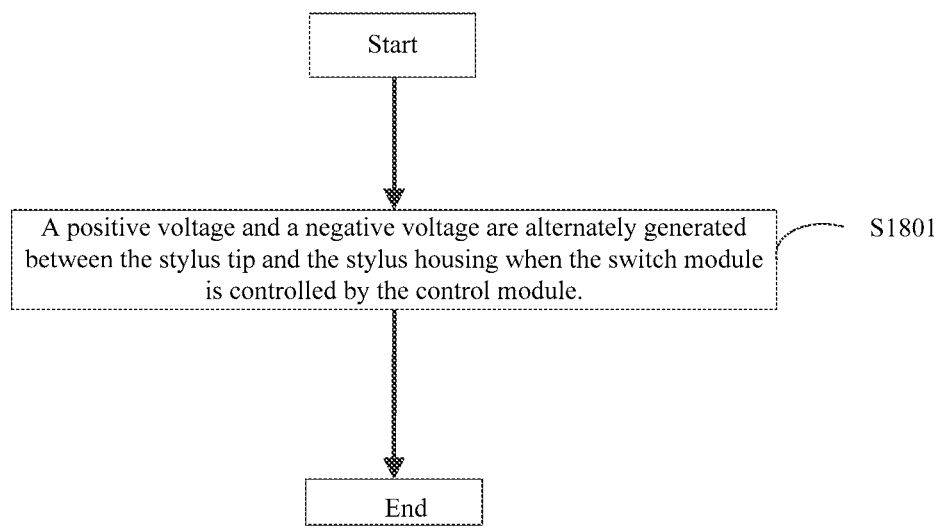
FIG. 18 illustrates a schematic block diagram of a driving method according to an embodiment of the present disclosure.

FIG. 18 shows a schematic block diagram of a driving method 500 according to an embodiment of the present disclosure. The driving method 400 is used for communication between an active stylus and a terminal device. The positive and negative voltage driving circuit of the active stylus is configured to execute the driving method. The positive and negative voltage driving circuit includes a positive and negative voltage generating module and a control unit. The positive and negative voltage driving circuit is the positive and negative voltage driving circuit of any one of the foregoing embodiments. The method includes:

in S1801, a positive voltage and a negative voltage are alternately generated between the stylus tip and the stylus housing when the switch module is controlled by the control module.

The driving method of the embodiment of the present disclosure significantly reduces the driving power consumption of the active stylus, and realizes that the power consumption of the floating positive and negative voltage driving circuit is only a quarter of the power consumption of the high-voltage generating circuit in the existing technology. And there is no need for the power supply unit to generate high DC voltage, thus reducing the difficulty of designing the power supply unit. Since the DC voltage input by the voltage unit to the positive and negative voltage driving circuit is low, the device does not need to withstand high voltages, which reduces the requirements for the device.

It should be understood that "one embodiment" or "an embodiment" mentioned throughout the specification means that a specific feature, structure, or characteristic related to the embodiment is included in at least one embodiment of the present disclosure. Therefore, "in one embodiment" or "in an embodiment" appeared in various places throughout the specification may not necessarily refer to the same embodiment. In addition, these specific features, structures or characteristics may be combined in one or more embodiments in any suitable manner.

It should be understood that, in various embodiments of the present disclosure, the sequence numbers of the foregoing processes does not mean the order of execution. The execution order of the processes should be determined by their functions and internal logic, and should not constitute any limitation on the implementation process of the embodiments of the present disclosure.

It should be understood that in the embodiments of the present disclosure, "B corresponding to A" means that B is associated with A, and B may be determined according to A. However, it should also be understood that determining B according to A does not mean that B is determined only according to A, and B may also be determined according to A and/or other information.

In addition, the terms "system" and "network" are often used interchangeably in this specification. It should be understood that the term "and/or" in this specification is only an association relationship describing the associated objects, indicating that there can be three types of relationships. For example, A and/or B can mean: A exists alone, both A and B exist, or B exists alone. In addition, the character "/" in this specification generally indicates that the associated objects before and after are in an "or" relationship.

Those of ordinary skill in the art may be aware that the units and circuits of the examples described in combination with the embodiments disclosed herein may be implemented by electronic hardware or a combination of computer software and electronic hardware. Whether these functions are performed by hardware or software depends on the specific application and design constraint conditions of the technical solution. Those skilled in the art may use different methods for each specific application to implement the described functions, but such implementation should not be considered beyond the scope of the present disclosure.

In the several embodiments provided by the present disclosure, it should be understood that the disclosed circuits, branches and units may be implemented in other ways. For example, the branch described above is illustrative. For example, the division of the unit is only a logical function division, and there may be other divisions in actual implementation. For example, multiple units or components may be combined or integrated into a branch or some features may be ignored or not implemented.

If the integrated unit is implemented in the form of a software functional unit and sold or used as an independent product, it may be stored in a computer readable storage medium. Based on this understanding, the technical solution of the present disclosure essentially or the part that contributes to the existing technology or part of the technical solution can be embodied in the form of a software product, and the computer software product is stored in a storage medium, including several instructions to make a computer device (which may be a personal computer, a server, or a network device, etc.) execute all or part of the steps of the methods described in the various embodiments of the present disclosure. The aforementioned storage mediums include: U disk, mobile hard disk, read-only memory (ROM), random access memory (RAM), magnetic disk or optical disk and other mediums that can store program codes.

The above are only specific implementations of the present disclosure, but the protection scope of the present disclosure is not limited to this. Any person skilled in the art can easily think of changes or substitutions within the technical scope disclosed in the present disclosure which should be covered within the protection scope of the present disclosure. Therefore, the protection scope of the present disclosure shall be subject to the protection scope of the claims.

What is claimed is:

1. A positive and negative voltage driving circuit of an active stylus, comprising:
a positive and negative voltage generating module comprising a switch module; and
a control module being configured to control a turn-off state and a turn-on state of the switch module, to enable the positive and negative voltage generating module to alternately output a positive voltage and a negative voltage to a stylus tip of an active stylus; wherein:
the positive and negative voltage generating module further comprises a first positive voltage generating module and a first negative voltage generating module; the first positive voltage generating module is configured to generate the positive voltage, one end of the first positive voltage generating module is connected to ground, and the other end of the first positive voltage generating module is connected to the stylus tip; the first negative voltage generating module is configured to generate the negative voltage, one end of the first negative voltage generating module is connected to the ground, and the other end of the first negative voltage generating module is connected to the stylus tip;
the first positive voltage generating module comprises a first boosting unit, the first boosting unit comprises a first inductor and a first diode, and the first boosting unit is configured to receive power from a power supply unit to charge the first inductor and to output energy to the stylus tip;
the first negative voltage generating module comprises a second boosting unit, the second boosting unit comprises a second inductor and a second diode, and the second boosting unit is configured to receive power from the power supply unit to charge the second inductor and to output energy to the stylus tip.

2. The positive and negative voltage driving circuit of an active stylus according to claim 1, wherein:
the active stylus comprises a stylus housing, and that the control module controls the switch module comprises a charging stage and a discharging stage; wherein,
in the charging stage, the control module controls the switch module to enable the power supply unit to charge the first inductor;
in the discharging stage, the control module controls the switch module to enable the energy charged by the first inductor in the charging stage to be transferred to a capacitor between the stylus tip and the stylus housing; and
the first diode is configured to maintain a voltage charged by the capacitor in the discharging stage;
the control module controls the switch module comprises the charging stage and the discharging stage; wherein,
in the charging stage, the control module controls the switch module to enable the power supply unit to charge the second inductor;
in the discharging stage, the control module controls the switch module to enable the energy charged by the second inductor in the charging stage to be transferred to a capacitor of the stylus tip; and
the second diode is configured to maintain the voltage charged by the capacitor in the discharge stage.

3. The positive and negative voltage driving circuit of an active stylus according to claim 2, wherein the switch module comprises a fourth switch, an eighth switch, a first switch, a second switch, a third switch, a fifth switch, a sixth switch and a seventh switch, and a control terminal of the fourth switch is grounded, a control terminal of the eighth switch is connected to the power supply unit, one end of the first switch is connected to the power supply unit, the other end of the first switch is connected to one end of the first inductor, the other end of the first inductor is connected to one end of the second switch and an anode of the first diode, the other end of the second switch is grounded, a cathode of the first diode is connected to one end of the third switch and one end of the fourth switch, and the other end of the fourth switch is connected to the stylus tip, and one end of the fifth switch is grounded, the other end of the fifth switch is connected to one end of the second inductor, the other end of the second inductor is connected to one end of the sixth switch and a cathode of the second diode, the other end of theسixth switch is connected to the power supply unit, an anode of the second diode is connected to one end of the seventh switch and one end of the eighth switch, and the other end of the eighth switch is connected to the stylus tip; and
the first switch, the fourth switch, the sixth switch and the seventh switch are positive channel metal oxide semiconductor (PMOS) devices, and the second switch, the third switch, the fifth switch and the eighth switch are negative channel metal oxide semiconductor (NMOS) devices.

4. The positive and negative voltage driving circuit of an active stylus according to claim 3, wherein the control module comprises a microcontroller unit (MCU) and a driving module, the MCU is configured to control the driving module to output a first control signal, a second control signal, a third control signal and a fourth control signal to the switch module; wherein the first control signal is configured to control a turn-off state and a turn-on state of the first switch, the second control signal is configured to control a turn-off state and a turn-on state of the second switch and a turn-off state and a turn-on state of the third switch, the third control signal is configured to control a turn-off state and a turn-on state of the sixth switch and a turn-off state and a turn-on state of the seventh switch, the fourth control signal is configured to control a turn-off state and a turn-on state of the fifth switch, to enable the stylus tip to alternately output the positive voltage and the negative voltage when the first switch, the second switch, the third switch, the fourth switch, the fifth switch, the sixth switch, the seventh switch and the eighth switch are alternately turned on;
wherein that the control module controls the switch module comprises a first stage, a second stage, a third stage, a fifth stage, an eighth stage, a fourth stage and a seventh stage;
in the first stage, the second switch, the third switch and the fifth switch are in the turn-on state, and the first switch, theسixth switch and the seventh switch are in the turn-off state, to initialize the positive and negative voltage driving circuit;
in the second stage, the first switch, the second switch, the third switch, the fifth switch and the eighth switch are in the turn-on state, the fourth switch, the sixth switch and the seventh switch are in the turn-off state, and the power supply unit charges the first inductor;
in the third stage, the first switch, the second switch, the third switch, the sixth switch and the seventh switch are in the turn-on state, the fifth switch and the eighth switch are in the turn-off state, and the power supply unit continues to charge the first inductor;
in the fourth stage, the first switch, the sixth switch and the seventh switch are in the turn-on state, the second switch, the third switch, the fifth switch and the eighth switch are in the turn-off state, and the energy stored by the first inductor in the second stage is transferred to the capacitor between the stylus tip and the stylus housing;

in the fifth stage, the first switch, the fifth switch, the sixth switch and the seventh switch are in the turn-on state, the second switch, the third switch and the eighth switch are in the turn-off state, and the power supply unit charges the second inductor;

in the seventh stage, the second switch, the third switch, the fifth switch and the eighth switch are in the turn-on state, the first switch, the fourth switch, the sixth switch and the seventh switch are in the turn-off state, and the energy stored by the second inductor in the fifth stage is transferred to the capacitor between the stylus tip and the stylus housing; and in the eighth stage, the first switch, the second switch, the third switch and the fifth switch are in the turn-on state, the fourth switch, the sixth switch and the seventh switch are in the turn-off state, and the power supply unit continues to charge the first inductor.

5. The positive and negative voltage driving circuit of an active stylus according to claim 4, wherein that the control module controls the switch module further comprises a sixth stage and a ninth stage;

in the sixth stage, the second switch, the third switch, the fifth switch, the sixth switch and the seventh switch are in the turn-on state, the first switch is in the turn-off state, the energy of the stylus tip and the stylus housing is transferred to the ground, and the power supply unit continues to charge the second inductor;

in the ninth stage, the first switch, the second switch, the third switch, the sixth switch and the seventh switch are in the turn-on state, the fifth switch is in the turn-off state, and the power supply unit continues to charge the first inductor; and the first stage, the second stage, the third stage, the fourth stage, the fifth stage, the sixth stage, the seventh stage, the eighth stage and the ninth stage are executed in sequence.

6. The positive and negative voltage driving circuit of an active stylus according to claim 5, wherein the positive and negative voltage generating module further comprises a second positive voltage generating module and a second negative voltage generating module; wherein the second positive voltage generating module is configured to generate the positive voltage, one end of the second positive voltage generating module is connected to the ground, and the other end of the second positive voltage generating module is connected to a stylus housing;

the second negative voltage generating module is configured to generate the negative voltage, one end of the second negative voltage generating module is connected to the ground, and the other end of the second negative voltage generating module is connected to the stylus housing;

the second positive voltage generating module comprises a third boosting unit, the third boosting unit comprises a third inductor and a third diode, the third boosting unit is configured to receive power from the power supply unit to charge the third inductor and to output energy to a capacitor between the stylus tip and the stylus housing;

the active stylus comprises the stylus housing, that the control module controls the switch module comprises a charging stage and a discharging stage; wherein in the charging stage, the control module controls the switch module to enable the power supply unit to charge the third inductor;

in the discharging stage, the control module controls the switch module to enable the energy charged by the third inductor in the charging stage to be transferred to the capacitor between the stylus tip and the stylus housing; and the third diode is configured to maintain a voltage charged by the capacitor in the discharging stage;

the second negative voltage generating circuit comprises a fourth boosting unit, the fourth boosting unit comprises a fourth inductor and a fourth diode, the fourth boosting unit is configured to receive power from the power supply unit to charge the fourth inductor and to output energy to a capacitor between the stylus tip and the stylus housing; and the control module controls the switch module comprises the charging stage and the discharging stage; wherein in the charging stage, the control module controls the switch module to enable the power supply unit to charge the fourth inductor;

in the discharging stage, the control module controls the switch module to enable the energy charged by the fourth inductor in the charging stage to be transferred to the capacitor between the stylus tip and the stylus housing; and the fourth diode is configured to maintain the voltage charged by the capacitor in the discharging stage.

7. The positive and negative voltage driving circuit of an active stylus according to claim 6, wherein the switch module comprises a twelfth switch, a sixteenth switch, a ninth switch, a tenth switch, an eleventh switch, a thirteenth switch, a fourteenth switch and a fifteenth switch, and a control terminal of the twelfth switch is grounded, a control terminal of the sixteenth switch is connected to the power supply unit, one end of the ninth switch is connected to the power supply unit, the other end of the ninth switch is connected to one end of the third inductor, the other end of the third inductor is connected to one end of the tenth switch and an anode of the third diode, the other end of the tenth switch is grounded, a cathode of the third diode is connected to one end of the eleventh switch and one end of the twelfth switch, and the other end of the twelfth switch is connected to the stylus tip, one end of the thirteenth switch is grounded, the other end of the thirteenth switch is connected to one end of the fourth inductor, the other end of the fourth inductor is connected to one end of the fourteenth switch and a cathode of the fourth diode, the other end of the fourteenth switch is connected to the power supply unit, an anode of the fourth diode is connected to one end of the fifteenth switch and one end of the sixteenth switch, and the other end of the sixteenth switch is connected to the stylus tip; and the ninth switch, the twelfth switch, the fourteenth switch and the fifteenth switch are PMOS devices, and the tenth switch, the eleventh switch, the thirteenth switch, and the sixteenth switch are NMOS devices.

8. The positive and negative voltage driving circuit of an active stylus according to claim 7, wherein the MCU is configured to control the driving module to output a fifth control signal, a sixth control signal, a seventh control signal and a eighth control signal to the switch module; wherein the fifth control signal is configured to control a turn-off state and a turn-on state of the ninth switch, the sixth control signal is configured to control a turn-off state and a turn-on state of the tenth switch and a turn-off state and a turn-on state of the eleventh switch, the seventh control signal is configured to control a turn-off state and a turn-on state of the fourteenth switch and a turn-off state and the turn-on state of a fifteenth switch, the eighth control signal is configured to control a turn-off state and a turn-on state of the thirteenth switch, to alternately generate the positive voltage and the negative voltage between the stylus tip and the stylus housing when the ninth switch, the tenth switch, the twelfth switch, the thirteenth switch, the fourteenth switch, the fifteenth switch and the sixteenth switch are alternately turned on;

in the first stage, the ninth switch, the fourteenth switch and the fifteenth switch are in the turn-on state, and the tenth switch, the eleventh switch and the thirteenth switch are in the turn-off state to initialize the positive and negative voltage driving circuit;

in the second stage, the ninth switch, the twelfth switch, the thirteenth switch, the fourteenth switch and the fifteenth switch are in the turn-on state, the tenth switch, the eleventh switch and the sixteenth switch are in the turn-off state, and the power supply unit charges the fourth inductor;

in the third stage, the tenth switch, the eleventh switch, the thirteenth switch, the fourteenth switch and the fifteenth switch are in the turn-on state, the ninth switch and the twelfth switch are in the turn-off state, and the power supply unit continues to charge the fourth inductor;

in the fourth stage, the tenth switch, the eleventh switch and the thirteenth switch are in the turn-on state, the ninth switch, the twelfth switch, the fourteenth switch and the fifteenth switch are in the turn-off state, and the energy stored by the fourth inductor in the second stage is transferred to the capacitor between the stylus tip and the stylus housing;

in the fifth stage, the ninth switch, the tenth switch, the eleventh switch and the thirteenth switch are in the turn-on state, the twelfth switch, the fourteenth switch and the fifteenth switch are in the turn-off state, and the power supply unit charges the third inductor;

in the seventh stage, the ninth switch, the twelfth switch, the fourteenth switch and the fifteenth switch are in the turn-on state, the ninth switch, the tenth switch, the eleventh switch and the sixteenth switch are in the turn-off state, and the energy stored by the third inductor in the fifth stage is transferred to the capacitor between the stylus tip and the stylus housing;

in the eighth stage, the ninth switch, the thirteenth switch, the fourteenth switch and the fifteenth switch are in the turn-on state, the tenth switch, the eleventh switch and the sixteenth switch are in the turn-off state, and the power supply unit continues to charge the fourth inductor.

9. The positive and negative voltage driving circuit of an active stylus according to claim 8, wherein:

in the sixth stage, the ninth switch, the tenth switch, the eleventh switch, the fourteenth switch and the fifteenth switch are in the turn-on state, the thirteenth switch is in the turn-off state, the energy of the stylus tip and the stylus housing is transferred to the ground, and the power supply unit continues to charge the third inductor;

in the ninth stage, the tenth switch, the eleventh switch, the thirteenth switch, the fourteenth switch and the fifteenth switch are in the turn-on state, the ninth switch is in the turn-off state, and the power supply unit continues to charge the fourth inductor; and the first stage, the second stage, the third stage, the fourth stage, the fifth stage, the sixth stage, the seventh stage, the eighth stage and the ninth stage are executed in sequence.

10. A positive and negative voltage driving circuit of an active stylus, comprising:

a positive and negative voltage generating module comprising a switch module; and a control module being configured to control a turn-off state and a turn-on state of the switch module, to enable the positive and negative voltage generating module to alternately output a positive voltage and a negative voltage to a stylus tip of the active stylus; wherein:

the positive and negative voltage generating module further comprises a first positive voltage generating module and a first negative voltage generating module; the first positive voltage generating module is configured to generate the positive voltage, the first negative voltage generating module is configured to generate the negative voltage; the positive and negative voltage generating module comprises a first boosting unit, the first boosting unit comprises a first inductor, a first diode and a second diode, and the first boosting unit is configured to receive power from a power supply unit to charge the first inductor and to output energy to the stylus tip;

the active stylus comprises a stylus housing, that the control module controls the switch module comprises a charging stage and a discharging stage; wherein, in the charging stage, the control module controls the switch module to enable the power supply unit to charge the first inductor;

in the discharging stage, the control module controls the switch module to enable the energy charged by the first inductor in the charging stage to be transferred to a capacitor of the stylus tip, and the first diode is configured to maintain a voltage charged by the capacitor in the discharging stage.

11. The positive and negative voltage driving circuit of an active stylus according to claim 10, wherein the switch module comprises a third switch, a sixth switch, a first switch, a second switch, a fourth switch and a fifth switch, and a control terminal of the third switch is grounded, a control terminal of the sixth switch is connected to the power supply unit, one end of the first switch is connected to the power supply unit, the other end of the first switch is connected to one end of the first inductor and one end of the fourth switch, the other end of the first inductor is connected to an anode of the first diode and a cathode of the second diode, a cathode of the first diode is connected to one end of the second switch and one end of the third switch, the other end of the second switch is grounded, the other end of the third switch is connected to the stylus tip, an anode of the second diode is connected to one end of the fifth switch and one end of the sixth switch, the other end of the sixth switch is connected to the stylus tip, and the other end of the fourth switch is grounded; and the first switch, the third switch and the fifth switch are PMOS devices, and the second switch, the fourth switch and the sixth switch are NMOS devices.

12. The positive and negative voltage driving circuit of an active stylus according to claim 11, wherein the control module comprises an MCU and a driving module, the MCU is configured to control the driving module to output a first control signal, a second control signal, a third control signal and a fourth control signal to the switch module; wherein the first control signal is configured to control a turn-off state and a turn-on state of the first switch, the second control signal is configured to control a turn-off state and a turn-on state of the second switch, the third control signal is configured to control a turn-off state and a turn-on state of the fifth switch, the fourth control signal is configured to control a turn-off state and a turn-on state of the fourth switch, to enable to alternately generate the positive voltage and the negative voltage between the stylus tip and the stylus housing when the first switch, the second switch, the third switch, the fourth switch, the fifth switch and the sixth switch are alternately turned on;

the control module controls the switch module comprises a first stage, a second stage, a third stage, a fourth stage, a fifth stage, a seventh stage and an eighth stage;

in the first stage, the second switch and the sixth switch are in the turn-on state, and the first switch, the third switch, the fourth switch and the fifth switch are in the turn-off state, to initialize the positive and negative voltage driving circuit;

in the second stage, the first switch, the second switch and the sixth switch are in the turn-on state, the third switch, the fourth switch and the fifth switch are in the turn-off state, and the power supply unit charges the first inductor;

in the third stage, the first switch, the second switch and the fifth switch are in the turn-on state, the third switch and the fourth switch are in the turn-off state, and the power supply unit continues to charge the first inductor;

in the fourth stage, the third switch and the fifth switch are in the turn-on state, the first switch, the second switch, the fourth switch and the sixth switch are in the turn-off state, and the energy stored by the first inductor in the second stage is transferred to a capacitor between the stylus tip and the stylus housing;

in the fifth stage, the fourth switch and the fifth switch are in the turn-on state, the first switch, the second switch and the sixth switch are in the turn-off state, and the power supply unit charges the first inductor;

in the seventh stage, the first switch, the fourth switch, the fifth switch and the sixth switch are in the turn-on state, the second switch and the third switch are in the turn-off state, and the energy stored by the first inductor in the fifth stage is transferred to the capacitor between the stylus tip and the stylus housing;

in the eighth stage, the first switch and the second switch are in the turn-on state, the third switch, the fourth switch, the fifth switch and the sixth switch are in the turn-off state, and the power supply unit continues to charge the first inductor.

13. The positive and negative voltage driving circuit of an active stylus according to claim 12, wherein that the control module controls the switch module further comprises a sixth stage and a ninth stage;

in the sixth stage, the second switch, the fourth switch and the fifth switch are in the turn-on state, the first switch and the sixth switch are in the turn-off state, the energy of the stylus tip and the stylus housing is transferred to the ground, and the power supply unit continues to charge the first inductor;

in the ninth stage, the first switch, the second switch and the fifth switch are in the turn-on state, the fourth switch is in the turn-off state, and the power supply unit continues to charge the first inductor; and the first stage, the second stage, the third stage, the fourth stage, the fifth stage, the sixth stage, the seventh stage, the eighth stage and the ninth stage are executed in sequence.

14. The positive and negative voltage driving circuit of an active stylus according to claim 10, wherein the positive and negative voltage generating module further comprises a second boosting unit, the second boosting unit comprises a second inductor, a third diode and a fourth diode, and the second boosting unit is configured to receive power from a power supply unit to charge the second inductor and to output energy to a capacitor between the stylus tip and the stylus housing;

the control module controls the switch module comprises a charging stage and a discharging stage; wherein, in the charging stage, the control module controls the switch module to enable the power supply unit to charge the second inductor;

in the discharging stage, the control module controls the switch module to enable the energy charged by the second inductor in the charging stage to be transferred to a capacitor between the stylus tip and the stylus housing; and the second diode is configured to maintain a voltage charged by the capacitor in the discharging stage.

15. The positive and negative voltage driving circuit of an active stylus according to claim 14, wherein the switch module further comprises a ninth switch, a twelfth switch, a seventh switch, an eighth switch, a tenth switch and an eleventh switch, and a control terminal of the ninth switch is grounded, a control terminal of the twelfth switch is connected to the power supply unit, one end of the seventh switch is connected to the power supply unit, the other end of the seventh switch is connected to one end of the second inductor and one end of the tenth switch, the other end of the second inductor is connected to an anode of the third diode and a cathode of the fourth diode, a cathode of the third diode is connected to one end of the eighth switch and one end of the ninth switch, the other end of the eighth switch is grounded, the other end of the ninth switch is connected to the stylus tip, an anode of the fourth diode is connected to one end of the eleventh switch and one end of the twelfth switch, the other end of the twelfth switch is connected to the stylus tip, and the other end of the tenth switch is grounded; and the seventh switch, the ninth switch and the eleventh switch are PMOS devices, and the eighth switch, the tenth switch and the twelfth switch are NMOS devices.

16. The positive and negative voltage driving circuit of an active stylus according to claim 15, wherein the MCU is configured to control the driving module to output a fifth control signal, a sixth control signal, a seventh control signal and an eighth control signal to the switch module; wherein the fifth control signal is configured to control a turn-off state and a turn-on state of the seventh switch, the sixth control signal is configured to control a turn-off state and a turn-on state of the eighth switch, the seventh control signal is configured to control a turn-off state and a turn-on state of the eleventh switch, the eighth control signal is configured to control a turn-off state and a turn-on state of the tenth switch, to alternately generate the positive voltage and the negative voltage between the stylus tip and the stylus housing when the seventh switch, the eighth switch, the ninth switch, the tenth switch, the eleventh switch and the twelfth switch are alternately turned on;

in the first stage, the eleventh switch and the twelfth switch are in the turn-on state, and the seventh switch, the eighth switch, the ninth switch and the tenth switch are in the turn-off state, to initialize the positive and negative voltage driving circuit;

in the second stage, the ninth switch, the tenth switch, the eleventh switch and the twelfth switch are in the turn-on state, the seventh switch and the eighth switch are in the turn-off state, and the power supply unit charges the second inductor;

in the third stage, the eighth switch, the tenth switch and the eleventh switch are in the turn-on state, the seventh switch and the ninth switch are in the turn-off state, and the power supply unit continues to charge the first inductor;

in the third stage, the eighth switch, the tenth switch and the eleventh switch are in the turn-on state, the seventh switch and the ninth switch are in the turn-off state, and the power supply unit continues to charge the first inductor;

in the fourth stage, the eighth switch and the twelfth switch are in the turn-on state, the seventh switch, the ninth switch, the tenth switch, the eleventh switch and the twelfth switch are in the turn-off state, and the energy stored by the first inductor in the second stage is transferred to the capacitor between the stylus tip and the stylus housing;

in the fifth stage, the seventh switch and the eighth switch are in the turn-on state, the tenth switch, the eleventh switch and the twelfth switch are in the turn-off state, and the power supply unit charges the second inductor;

in the seventh stage, the eleventh switch and twelfth switch are in the turn-on state, the seventh switch, the eighth switch, the ninth switch and the tenth switch are in the turn-off state, and the energy stored by the second inductor in the fifth stage is transferred to the capacitor between the stylus tip and the stylus housing;

in the eighth stage, the tenth switch and the eleventh switch are in the turn-on state, the seventh switch, the eighth switch, the ninth switch and the twelfth switch are in the turn-off state, and the power supply unit continues to charge the first inductor.

17. The positive and negative voltage driving circuit of an active stylus according to claim 16, wherein:

in the sixth stage, the seventh switch, the eighth switch and the eleventh switch are in the turn-on state, the tenth switch and the twelfth switch are in the turn-off state, the energy of the stylus tip and the stylus housing is transferred to the ground, and the power supply unit continues to charge the first inductor;

in the ninth stage, the eighth switch, the tenth switch and the eleventh switch are in the turn-on state, the seventh switch is in the turn-off state, and the power supply unit continues to charge the first inductor; and the first stage, the second stage, the third stage, the fourth stage, the fifth stage, the sixth stage, the seventh stage, the eighth stage and the ninth stage are executed in sequence.

18. A chip, comprising a positive and negative voltage driving circuit selected from any one of:

(i) the positive and negative voltage driving circuit of an active stylus comprises:

a positive and negative voltage generating module comprising a switch module; and a control module being configured to control a turn-off state and a turn-on state of the switch module, to enable the positive and negative voltage generating module to alternately output a positive voltage and a negative voltage to a stylus tip of an active stylus; wherein:

the positive and negative voltage generating module further comprises a first positive voltage generating module and a first negative voltage generating module; the first positive voltage generating module is configured to generate the positive voltage, one end of the first positive voltage generating module is connected to ground, and the other end of the first positive voltage generating module is connected to the stylus tip; the first negative voltage generating module is configured to generate the negative voltage, one end of the first negative voltage generating module is connected to the ground, and the other end of the first negative voltage generating module is connected to the stylus tip;

the first positive voltage generating module further comprises a first boosting unit, the first boosting unit comprises a first inductor and a first diode, and the first boosting unit is configured to receive power from a power supply unit to charge the first inductor and to output energy to the stylus tip;

the first negative voltage generating module comprises a second boosting unit, the second boosting unit comprises a second inductor and a second diode, and the second boosting unit is configured to receive power from the power supply unit to charge the second inductor and to output energy to the stylus tip;

(ii) the positive and negative voltage driving circuit of an active stylus comprises:

a positive and negative voltage generating module comprising a switch module; and a control module being configured to control a turn-off state and a turn-on state of the switch module, to enable the positive and negative voltage generating module to alternately output a positive voltage and a negative voltage to a stylus tip of the active stylus; wherein:

the positive and negative voltage generating module further comprises a first positive voltage generating module and a first negative voltage generating module; the first positive voltage generating module is configured to generate the positive voltage, the first negative voltage generating module is configured to generate the negative voltage; the positive and negative voltage generating module comprises a first boosting unit, the first boosting unit comprises a first inductor, a first diode and a second diode, and the first boosting unit is configured to receive power from a power supply unit to charge the first inductor and to output energy to the stylus tip;

the active stylus comprises a stylus housing, that the control module controls the switch module comprises a charging stage and a discharging stage; wherein, in the charging stage, the control module controls the switch module to enable the power supply unit to charge the first inductor;

in the discharging stage, the control module controls the switch module to enable the energy charged by the first inductor in the charging stage to be transferred to a capacitor of the stylus tip, and the first diode is configured to maintain a voltage charged by the capacitor in the discharging stage.

* * * * *